US011316932B2

(12) United States Patent
Smith

(10) Patent No.: US 11,316,932 B2
(45) Date of Patent: Apr. 26, 2022

(54) DEVICE MANAGEMENT SERVICES BASED ON RESTFUL MESSAGING

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/637,650

(22) PCT Filed: Sep. 21, 2018

(86) PCT No.: PCT/US2018/052265
§ 371 (c)(1),
(2) Date: Feb. 7, 2020

(87) PCT Pub. No.: WO2019/060758
PCT Pub. Date: Mar. 28, 2019

(65) Prior Publication Data

US 2020/0274934 A1 Aug. 27, 2020

Related U.S. Application Data

(60) Provisional application No. 62/571,657, filed on Oct. 12, 2017, provisional application No. 62/569,326, (Continued)

(51) Int. Cl.
*H04L 29/08* (2006.01)
*H04L 67/142* (2022.01)
(Continued)

(52) U.S. Cl.
CPC ........ *H04L 67/142* (2013.01); *H04L 41/0806* (2013.01); *H04L 47/82* (2013.01); (Continued)

(58) Field of Classification Search
CPC ... H04L 67/142; H04L 41/0806; H04L 47/82; H04L 67/12; H04L 67/141; H04L 67/14; G16Y 10/75; H04W 4/70; H04W 4/50
See application file for complete search history.

(56) References Cited

U.S. PATENT DOCUMENTS 10,148,506 B1 * 12/2018 Anburose ........... H04L 41/0853
10,467,036 B2 * 11/2019 Anwar ................ G06F 11/3442
(Continued)

FOREIGN PATENT DOCUMENTS

WO WO-2016077716 A1 5/2016
WO WO-2019060758 A1 3/2019

OTHER PUBLICATIONS

"International Application Serial No. PCT/US201 8/052265, International Search Report dated Jan. 14, 2019", 5 pgs.
(Continued)

*Primary Examiner* — Michael Won
(74) *Attorney, Agent, or Firm* — Schwegman Lundberg & Woessner, P.A.

(57) ABSTRACT

Various systems and methods of establishing and utilizing device management (DM) services in Internet of Things (IoT) networks and similar distributed network architectures, are described. In an example, RESTful messaging within IoT operational and resource models are used to establish, instantiate, and operate DM services having various roles within an IoT framework abstraction.

25 Claims, 16 Drawing Sheets

Related U.S. Application Data filed on Oct. 6, 2017, provisional application No. 62/562,201, filed on Sep. 22, 2017.

(51) Int. Cl.

*H04L 41/0806* (2022.01)
*H04L 47/70* (2022.01)
*H04L 67/12* (2022.01)
*H04L 67/141* (2022.01)
*G16Y 10/75* (2020.01)

(52) U.S. Cl.

CPC ............ *H04L 67/12* (2013.01); *H04L 67/141* (2013.01); *G16Y 10/75* (2020.01)

(56) References Cited

U.S. PATENT DOCUMENTS

| | | | | |
|---|---|---|---|---|
| 2013/0086210 | A1* | 4/2013 | Yiu | H04W 12/068 709/217 |
| 2015/0055640 | A1* | 2/2015 | Wang | H04W 60/00 370/338 |
| 2019/0132211 | A1* | 5/2019 | Yeung | H04L 41/0896 |
| 2019/0141536 | A1* | 5/2019 | Bachmutsky | H04L 67/10 |
| 2020/0177681 | A1* | 6/2020 | Wang | G06F 9/46 |
| 2020/0195696 | A1* | 6/2020 | Seed | H04W 4/70 |
| 2020/0274934 | A1* | 8/2020 | Smith | H04L 41/0806 |

OTHER PUBLICATIONS

"International Application Serial No. PCT/US2018/052265, Written Opinion dated Jan. 14, 2019", 7 pgs.

"Machine-to-Machine communications (M2M) : Functional architectur", ETSI Draft ; TS 102690V2-0-1 Rev Marks, European Telecmmunications Standards Institute (ETSI), 650, Route Des Lucioles; F06921 Sophia-Antipolis ;France, No. V2.0.1,XP014068743, (Dec. 21, 2011), 1-283 pgs.

"International Application Serial No. PCT US2018 052265, International Preliminary Report on Patentability dated Apr. 2, 2020", 9 pgs.

* cited by examiner

DOTS RESOURCES

- /OIC/SVC/DOMAIN - <DOMAINID>
- /OIC/SVC/DOTS - <MYOXMS[], MYDIMS[], ...>
- /OIC/SVC/DOTS/MYTRUSTEDDEVICES – COLLECTION-OF-TRUSTEDDEVICE
- /TRUSTEDDEVICE - <DI, OXMSEL, ...>
- /OIC/SVC/DOTS/MYDELEGATIONS – COLLECTION-OF-DELEGATIONS
- /DELEGATIONS - <DI, OCF_ROLE, ...>
- /OIC/SVC/DOTS/MYPEERS – COLLECTION-OF-PEERS
- /PEERS - <DI, ...>
- /OIC/SVC/DOTS/MYTRUSTEDDOMAINS – COLLECTION-OF-TRUSTEDDOMAINS
- /TRUSTEDDOMAINS - <DOMAINID, DI, OCF_ROLE, DOMAIN_POLICIES, ...>

502

DOTS COMPANION RESOURCES - ON PEER DOTS SERVICES

- /OIC/SVC/DOTS/MYTRUSTEDDEVICES – AS PROXY OR CACHING PROXY

504

DOTS COMPANION RESOURCES - ON TRUSTED DEVICE

- /OIC/SEC/DOXM – AS DEFINED IN THE OCF SECURITY SPEC
- /OIC/SEC/PSTAT – AS DEFINED IN THE OCF SECURITY SPEC
- /OIC/SEC/CRED – CONFIGURE CRED FOR DELEGATED SERVICES
- /OIC/SEC/ACL2 – CONFIGURE ACCESS BY DELEGATED SERVICES

DOTS RESOURCE MODEL (BUNDLE/COLLECTION)

- /OIC/SVC/DOTS – ISA SERVICE RESOURCE
  - "RT"="OIC.SVC.DOTS"
  - BUNDLE METADATA:
    - "PARENTNAME"=""
    - "CHILDTYPE"="OIC.DOMAIN, OIC.BNDL.TRUSTEDDEVICES, OIC.BNDL.PEERDOTS, OIC.BNDL.CREDMGRS, OIC.BNDL.ACCESSMGRS, OIC.BNDL.TRUSTEDDOMAINS"
  - SERVICE METADATA:
    - "ROLE"="OIC.ROLE.SVC.DOTS"
    - "PEERSALLOWED"= TRUE
    - "INTERDOMAINPEERSALLOWED"=TRUE
    - "SUBORDINATESALLOWED"=TRUE
    - "SUBORDINATES"="OIC.SVC.CMS, OIC.SVC.AMS"
  - PROPERTIES: MYOXMS[]

512

DOTS RESOURCE MODEL CHILD RESOURCES (BUNDLE/COLLECTION)

- /ITR, /DOMAIN
- /TRUSTEDDEVICES – ISA BUNDLE RESOURCE
  - "RT"="OIC.BNDL.TRUSTEDDEVICES" (PROPERTIES: MYOXMS[])
  - "CHILDTYPE"="OIC.TRUSTEDDEVICE"
  - /TRUSTEDDEVICE1 (PROPERTIES: DI, OXMSEL, CREDREF, COMPANIONS[])
- /MYCREDMGRS – ISA BUNDLE RESOURCE
  - "RT"="OIC.BNDL.CREDMGRS"
  - "CHILDTYPE"="OIC.CREDMGR"
  - /CREDMGR1 (PROPERTIES: DI, ROLECREDREF)
- /MYACCESSMGRS – ISA BUNDLE RESOURCE
  - "RT"="OIC.BNDL.ACCESSMGRS"
  - "CHILDTYPE"="OIC.ACCESSMGR"
  - /ACCESSMGR1 (PROPERTIES: DI, ROLECREDREF)
- /MYPEERDOTS – ISA BUNDLE RESOURCE
  - "RT"="OIC.BNDL.PEERDOTS"
  - "CHILDTYPE"="OIC.PEERDOTS"
  - /PEERDOTS1 (PROPERTIES: DI, ROLECREDREF)
- /MYTRUSTEDDOMAINS – ISA BUNDLE RESOURCE
- "RT"="OIC.BNDL.TRUSTEDDOMAINS" (PROPERTIES: MYDIMS[] (DOMAIN INTRODUCTION METHOD))
- "CHILDTYPE"="OIC.TRUSTEDDOMAIN"
- /TRUSTEDDOMAIN1 (PROPERTIES: DOMAINID, DI, CREDREF, DIMSEL)

CMS RESOURCES
- /OIC/SVC/CMS/MYSUPERIOR - <DI>
- /OIC/SVC/CMS - <MYCREDTYPES[], MYKXMS[], MYCRMS[],...>
- /OIC/SVC/CMS/MYCMSDEVICES – COLLECTION-OF-CMSDEVICE
- /CMSDEVICE - <DI, SCTS[], ,SKXMS[], SCRMS[]...>

522

CMS RESOURCE MODEL (BUNDLE/COLLECTION)
- /OIC/SVC/CMS – IS A SERVICE RESOURCE
  - "RT"="OIC.SVC.CMS"
- BUNDLE METADATA:
  - "PARENTNAME"=/OIC/SVC/*DOTS*
  - "CHILDTYPE"="OIC.DOMAIN, OIC.BNDL.CMSDEVICES"
- SERVICE METADATA:
  - "ROLE"="OIC.ROLE.SVC.CMS"
  - "PEERSALLOWED"=FALSE
  - "INTERDOMAINPEERSALLOWED"=FALSE
  - "SUBORDINATESALLOWED"=FALSE
  - "SUBORDINATES"=""

524

CMS RESOURCE MODEL CHILD RESOURCES (BUNDLE/COLLECTION)
- /ITR, /DOMAIN
- /CMSDEVICES – ISA BUNDLE RESOURCE
  - "RT"="OIC.BNDL.CMSDEVICES" (PROPERTIES: MYCOMPANIONS[], MYCREDTYPES[], MYKEYEXMETHODS[], MYCREDREFRESHMETHODS[])
  - "CHILDTYPE"="OIC.CMSDEVICE"
  - /CMSDEVICE1 (PROPERTIES: DI, CREDREF, COMPANIONS[], CREDTYPES[], CREDREFRESHMETHODS[], KEYEXMETHODS[])

526

CMS COMPANION RESOURCES - ON MANAGED DEVICE
- /OIC/SEC/PSTAT – UPDATE DEVICE STATE AS REQUIRED
- /OIC/SEC/CRED – CRUDN OPERATIONS AS NEEDED
- /OIC/SEC/ROLES – MAINTENANCE

AMS RESOURCES

- /OIC/SVC/AMS/MYSUPERIOR - <DI>
- /OIC/SVC/AMS - <MYACETYPES[],...>
- /OIC/SVC/AMS/MYAMSDEVICES – COLLECTION-OF-DEVICE ACES
  - /DEVICEACES - <DI, SACLS, ...>
    - ACL2 COLLECTION, - OPTIONAL AS NEEDED
    - AMACL COLLECTION, - OPTIONAL AS NEEDED
    - SACL COLLECTION, - OPTIONAL AS NEEDED

532

AMS RESOURCE MODEL (BUNDLE/COLLECTION)

- /OIC/SVC/AMS – ISA SERVICE RESOURCE
  - "RT"="OIC.SVC.AMS
- BUNDLE METADATA:
  - "PARENTNAME"=/OIC/SVC/DOTS
  - "CHILDTYPE"="OIC.DOMAIN, OIC.BNDL.AMSDEVICES"
- SERVICE METADATA:
  - "ROLE"="OIC.ROLE.SVC.AMS"
  - "PEERSALLOWED"=FALSE
  - "INTERDOMAINPEERSALLOWED"=FALSE
  - "SUBORDINATESALLOWED"=FALSE
  - "SUBORDINATES"=""

534

AMS RESOURCE MODEL CHILD RESOURCES (BUNDLE/COLLECTION)

- /ITR, /DOMAIN
- /AMSDEVICES – ISA BUNDLE RESOURCE
  - "RT"="OIC.BNDL.AMSDEVICES" (PROPERTIES: MYCOMPANIONS[], MYACETYPES[])
  - "CHILDTYPE"="OIC.AMSDEVICE"
  - /AMSDEVICE1 (PROPERTIES: DI, CREDREF, COMPANIONS[], ACES[])

536

AMS RESOURCES - ON MANAGED DEVICE

- /OIC/SEC/PSTAT – UPDATE DEVICE STATE AS REQUIRED
- /OIC/SEC/ACL2 – CRUDN OPERATIONS AS NEEDED
- /OIC/SEC/AMACL – CRUDN OPERATIONS AS NEEDED
- /OIC/SEC/SACL – CRUDN OPERATIONS AS NEEDED

DEVICE MANAGEMENT SERVICES BASED ON RESTFUL MESSAGING

PRIORITY CLAIM

This application is a U.S. National Stage Application under 35 U.S.C. 371 from International Application No. PCT/US2018/052265, filed Sep. 21, 2018, published as WO 2019/060758, which claims the benefit of priority to U.S. Provisional Patent Application Ser. No. 62/571,657, filed Oct. 12, 2017 and titled "DEVICE MANAGEMENT SERVICES BASED ON RESTFUL MESSAGING", 62/569,326, filed Oct. 6, 2017, and titled "REPRESENTATIONS AND INTERACTIONS WITH ARRAYS OF INTERNET OF THINGS (IOT) RESOURCES", and 62/562,201, filed Sep. 22, 2017, and titled "REPRESENTATIONS AND INTERACTIONS WITH ARRAYS OF INTERNET OF THINGS (IOT) RESOURCES"; the above-identified applications are incorporated herein by reference in their entirety.

TECHNICAL FIELD

Embodiments described herein generally relate to interconnected device networks, and in particular, to techniques for establishing connections and implementing functionality among internet of things (IoT) devices and device networks.

BACKGROUND

IoT devices are physical or virtualized objects that may communicate on a network, and may include sensors, actuators, and other input/output components, such as to collect data or perform actions from a real-world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 5A-5D illustrates a listing of resources and companion resources for onboarding, credential management, and access management service operations, according to an example;

DETAILED DESCRIPTION

Figure 1:
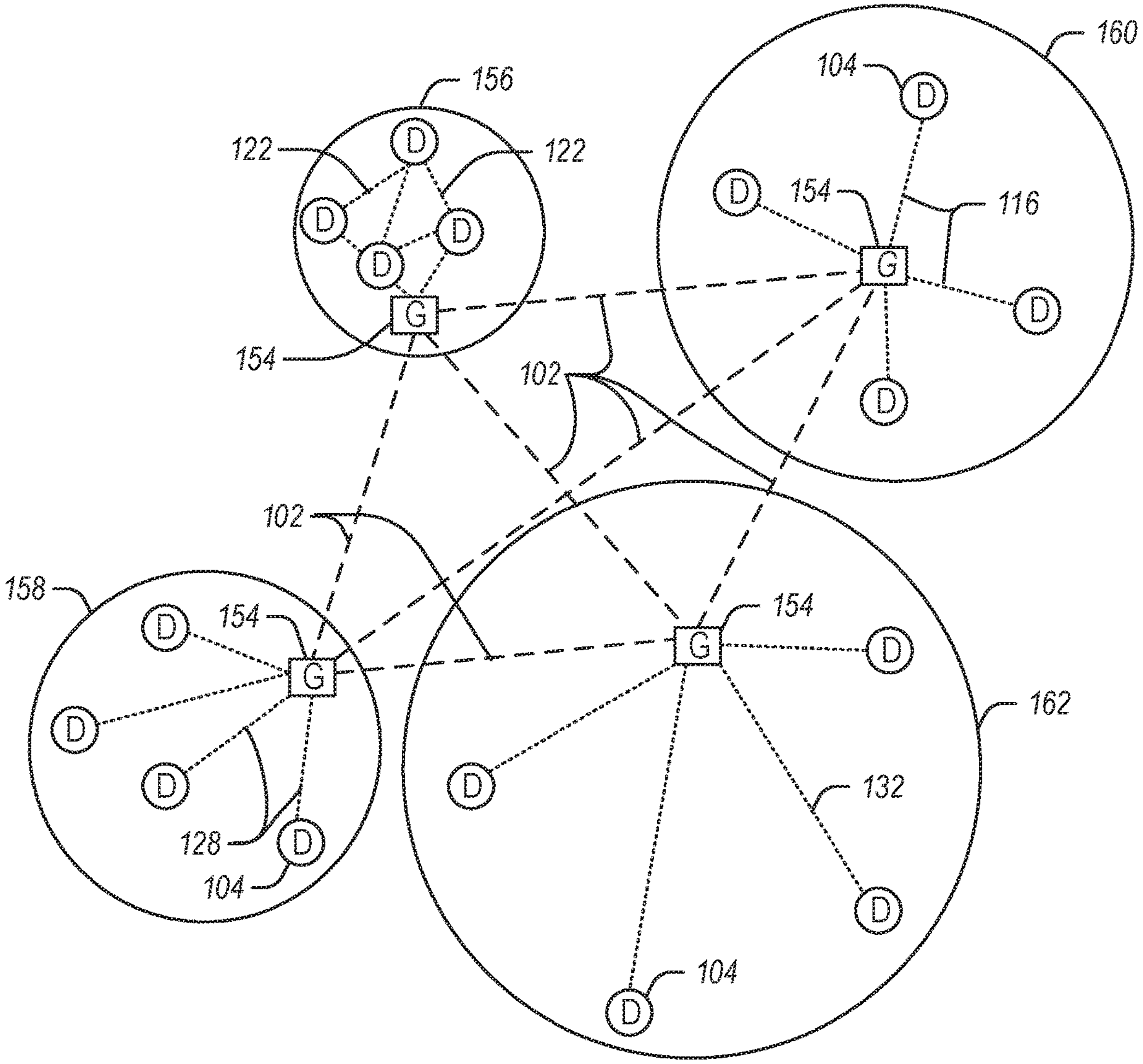
FIG. 1 illustrates a domain topology for respective internet-of-things (IoT) networks coupled through links to respective gateways, according to an example.

In the following description, methods, configurations, and related apparatuses are disclosed for establishing and utilizing a resource model to define device management (DM) services within an IoT framework. The approaches discussed herein establish improvements to IoT resource model abstraction, such as to allow definition and use of such DM services based on RESTful messaging and similar stateless operations. The approaches discussed herein also enable IoT device management through use of an IoT DM services data model that utilizes core device definition building blocks. As discussed herein, DM services may be operated in the fashion of another IoT device that additionally may be dynamically provisioned with device management services; with the provisioning of DM services itself being operable as a DM service.

As discussed herein, the present techniques and configurations provide improvements for a variety of IoT device management and network operation use cases. This results in a number of technical benefits, including the clear definition of the behavior, duties, and capabilities for DM services such as in an implementation of an onboarding, access management, or credential management service. Further, the service abstraction discussed herein may be utilized for building and instantiating multiple DM services and types of DM services.

In the examples provided with reference to an OCF network implementation, a DM service abstraction allows multiple services in a domain to be built, instantiated, and controlled, in the same manner as a OCF device. The deployment of a DM service in a resource model abstraction also provides a life cycle wrapped around the DM service, to allow an instance of the DM service to be dynamically brought into operation, used for useful operations, and transitioned to another instance of the DM service if the instance fails. With use of this resource model abstraction, a variety of DM services may be launched and operated with CRUD RESTful commands such as CREATE, UPDATE, or DELETE.

As discussed herein, device management that is both specific and generic (stereotyped) to a device may be dynamically created or removed, with the same ease of use and flexibility that an IoT device may be instantiated/de-instantiated according to an IoT framework data model (such as a conventional OCF data model). Various approaches are also disclosed for establishing a "subordinate" type of DM service, and utilizing a "superior" DM service, as defined in an IoT framework data model (e.g., the OCF Resource model) where the service function is abstracted from a set of resources and actions.

Additionally, methods, configurations, and related apparatuses are disclosed for establishing and utilizing groups of resources through the dynamic instantiation of resources within an IoT framework. The approaches discussed herein establish improvements to IoT resource model abstraction, to create sets or arrays of devices, device resources, or other objects programmatically, even though the corresponding physical device may be in a different network or may not exist at all. The approaches discussed herein also enable the representation of a service or a service action, including a specific DM service or service action, through a collection of device actions. This allows complex sequences of actions or transactions to accomplish a particular task among such sets or arrays of devices.

As discussed herein, the resource grouping techniques provide improvements for a variety of IoT resource management and network operation use cases. This provides a number of benefits, including greater flexibility for cloud, gateway, data center, and IoT device management entities to utilize networks of IoT devices, aggregations of IoT devices, resources and proxy resources, and even "ghost" resources, which are hosted away from the native or physical device. As discussed herein, this approach may be implemented while allowing object model interface definitions to behave as expected. As a result, network interface access may be multiplexed across the sub-resources of the set or array object as if these resources were directly connected to the IoT network.

Further, various operational models are disclosed to establish arrays (e.g., sets, groups, collections) of devices within an IoT framework abstraction. In these operational models, the parent resource of the child resources in the array may be established yet remain hidden from the IoT object abstraction. Hence, there need not be object model interface definitions—normally a required element of device definition. As a result, abstract devices may be more easily created to assemble device data from among sets of similar resources aggregated over many physical devices and resources. Utilization of such devices assists with improved IoT analytics, replication, availability and continuity, among other operational benefits.

These and other benefits of the presently disclosed approaches within standardized network implementations and similar IoT network settings will be apparent from the following disclosure.

FIG. 1 illustrates an example domain topology for respective IoT networks coupled through links to respective gateways. The IoT supports deployments in which a large number of computing devices are interconnected to each other (and to the Internet) to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
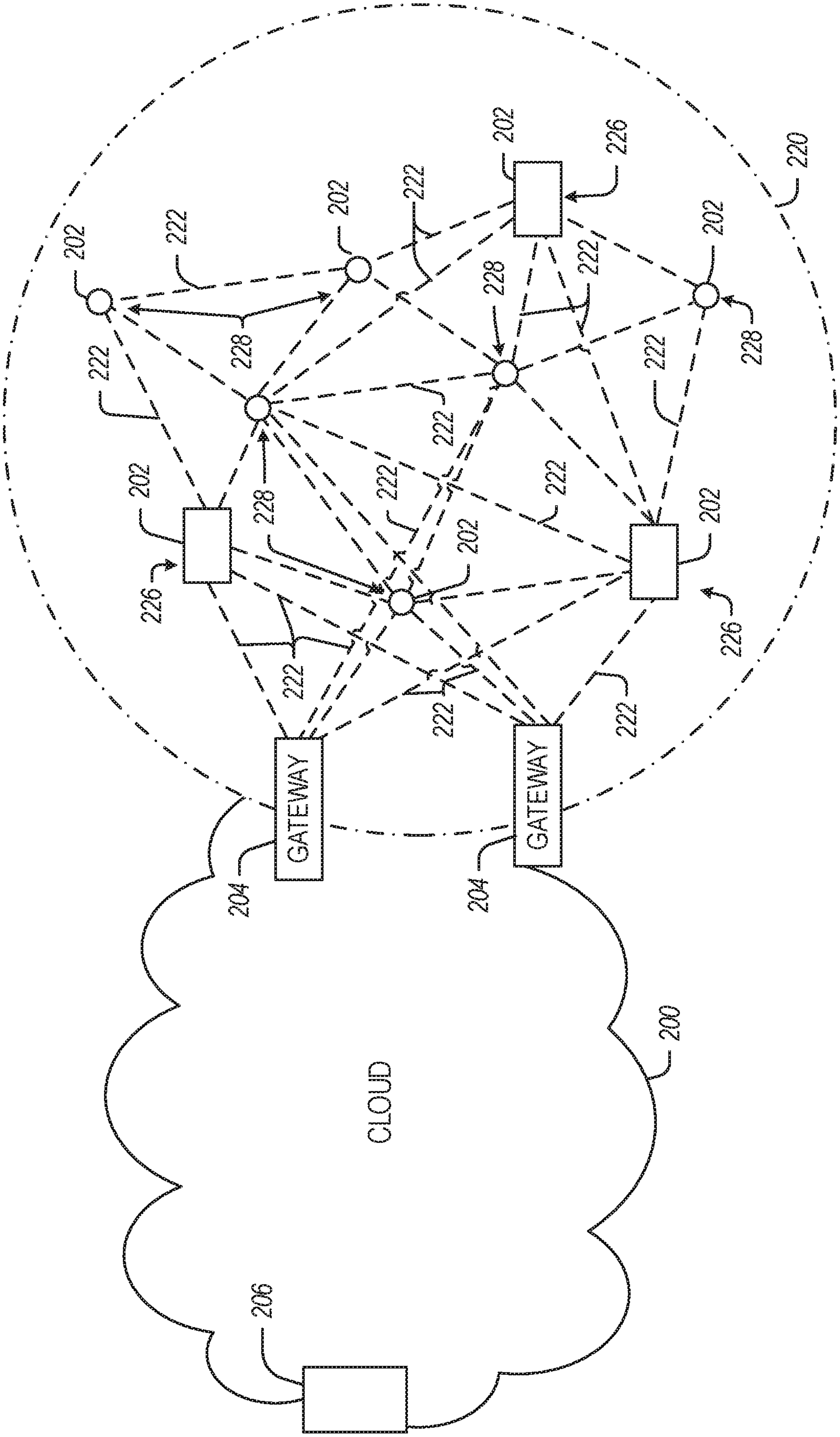
FIG. 2 illustrates a cloud computing network in communication with a mesh network of IoT devices operating as a fog device or platform connected with a cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, or vibration into the autonomous organizations among the IoT devices. The integration of sensory systems may allow systematic and autonomous communication and coordination of service delivery against contractual service objectives, orchestration and QoS-based swarming and fusion of resources. Individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 11 and 12.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge". "fog", and "cloud" are not necessarily discrete or exclusive of one another.

As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state muting (OLSR) Protocol, the better approach to mobile ad-hoc networking (B.A.T.M.A.N.) routing protocol or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style. e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog network 220 device to the server 206 to answer the query. In this example, IoT devices 202 in the fog network 220 may select the sensors 228 used based on the query, such as adding data from flow sensors or temperature sensors. Further, if some of the IoT devices 202 are not operational other IoT devices 202 in the fog network 220 may provide analogous data, if available.

Within these and like network settings, instances of IoT devices may be deployed in a physical or logical instantiation. A physical instantiation may exist as part of device manufacturing, whereas a logical instantiation may be dynamically instantiated by an 'intermediary' server that wishes to 'front-end' or 'back-end' a device-to-device, service-to-device or, device-to-service interaction. Instantiation of logical device instances is typically performed by the intermediary based on a standard interface/data model definition specification or by obtaining a template device definition file from a repository. For example, limited approaches for establishing device description repository requirements have attempted to be standardized in a W3C standard.

Device management (DM) consoles and services, however, must refer to human-readable specifications and machine-readable device descriptions in order to produce useful DM implementations. Such implementations often require use of software, firmware, and hardware developers and custom design and development work to realize a device management solution. This is costly and labor intensive, and does not leverage the automation tools available to IoT device design and implementation. Additionally, although various efforts such as the Distributed Management Task Force (DMTF) have attempted to define standards, tools and data models for management of PCs over a network, such approaches do not define solutions suitable for IoT networks and do not define DM services as a dynamically applied capability to a general-purpose device (as a building block technology).

The techniques and configurations discussed herein address these and other common technical issues with IoT device management, through the definition and use of an IoT DM services data model using core device definition building blocks. The definition and use of such data model may provide various approaches for configuring and using DM services, including in the form of a superior or subordinate DM service (and multiple peers or instances of such services).

In an example, a "subordinate" type of DM service may be dynamically instantiated/de-instantiated by a "superior" DM service (as needed). In such cases, device/service management instantiation is recursive. For example, superior DM services may securely delegate authorization to perform a subordinate DM service, using "role" credentials such as certificates, tickets, or by directly provisioning to a device's secure storage resource. Also for example, subordinate services may be defined using an IoT framework data model (e.g., the OCF Resource model) where the service function is abstracted in the form of a set of resources and actions. In such a scenario, resources defined on the superior service are the data objects that a managed device or subordinate service may use to update or otherwise synchronize with a local representation that is specific to the device or subordinate instance.

A superior service may be configured within this approach to implement actions, with such actions providing the steps used to perform a specific DM objective. In an example, actions may take the form of a resource containing a RESTful command structure that is "executed" or "evaluated" or "performed" by the DM service. In another example, actions may be embedded software, firmware. FPGA bitstreams, or other instructions or logic that implements discrete "steps" of DM service operations. Further, the provisioning of resources, actions (as resources), actions (as SW/FW/FPGA bitstreams) may increasingly apply steps that manage both actions and resources of the device or subordinate being serviced.

Additionally, in an example, a first superior service may form a first domain (where IoT DM operations are performed) that becomes the domain wherein subordinate services and devices are "owned" and otherwise regarded as belonging to the superior DM service. A peer superior DM service also may be instantiated by a first DM service that later transfers ownership and responsibility to manage its current set of subordinates. For example, this approach may be utilized to achieve workload balancing, failover, or other strategies for highly available DM services.

As discussed herein, references are made to example "DOTS", "AMS", "CMS", "DC", and "ZC" DM services in OCF network implementations. In an example, DOTS (Device Owner Transfer Service, which may also be termed "DOXS") is a transfer and device onboarding service that supports the introduction of devices into a domain and onto a local network. Also in an example, CMS (Credential Management Service) is a service that handles the responsibility of device credential provisioning and management in a network. Also in an example AMS (Access Management Service) is a service that implements an access management capability for maintenance of resources for access control entries (ACEs) and access control operations. Also in an example, DC (Domain Controller) is a service that implements and manages a domain management or organizational capability in a network. Also in an example, ZC (Zone Controller) is a service that implements and manages a zone management or organizational capability in a network (with one or multiple zones within a domain). Further, in some examples, DC performs service delegation steps, which enables DOTS to operate as a subordinate service at an equal level as CMS and AMS. It will be understood that other terminology and roles may be utilized for equivalent DM services in other implementations. Further, in one example, all of the above service types are OCF resources that may be instantiated on an OCF device in addition to regular device resources.

Figure 3:
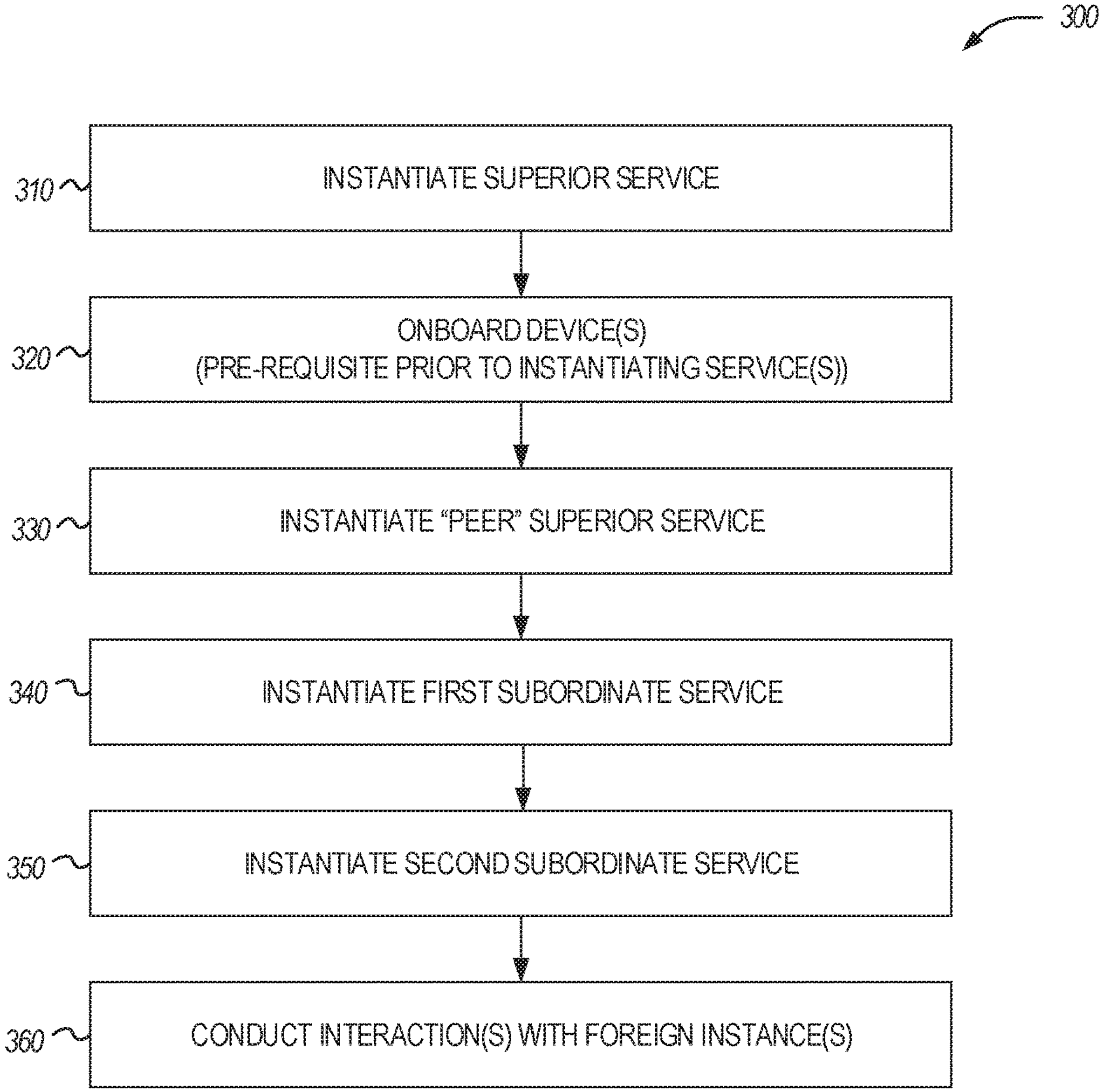
FIG. 3 illustrates a flowchart of an example method for device management (DM) service instantiation, according to an example.

FIG. 3 illustrates a flowchart 300 of an example method for DM service instantiation. As shown, the operations of the flowchart 300 commence with the instantiation of a superior DM service on a device (e.g., Device 0) (operation 310), and the onboarding of respective devices (e.g., Devices 1-3) used to serve as additional DM services (operation 320). The onboarding of these additional respective device instances is established as a pre-requisite prior to instantiating DM services on these respective devices.

The operations of the flowchart 300 continue with the instantiation of a "peer" superior service (operation 330) on an onboarded device, which may provide an instance of the same service as operating with the superior service (e.g., a second instance of the same type of DM service). This is followed by instantiating a first subordinate service (operation 340) and a second subordinate service (operation 350) in respective roles, and operating the respective DM services to conduct interactions with foreign instances of devices and other services (operation 360). An example of this sequence, as applied to a DM service in an OCF framework, is further illustrated in FIG. 4, as discussed below.

In an example, the initial DM service instantiation for an OCF Device that is "self-onboarded" (e.g., oxmsel=oic.sec.oxm.self) may be provisioned with service(s) by its host application, and may include authentication of a domain user and established physical presence. Further, an initial service instantiation may involve issuing 'role' credentials, such as self-signed certificates. Also an example, the peer DM service instances may be established as the self-onboarded service instantiates the peer service on a device. Such service resources may be embedded or are caused with CREATE, and service actions may be embedded or are provisioned (e.g., with a SW update or Action Resource operation).

In an example, subordinate DM service instances may be established as a superior service obtains authorization to instantiate a subordinate service, and the superior service instantiates the subordinate service by creating or provisioning service resources and actions (e.g., as is performed with peer service instantiation). For example, in a DOTS DM service, DOTS instantiates CMS and AMS.

In still a further example, foreign instances of a DM service may be coordinated. For example, DOTS from Domain A may utilize a Domain Introduction Method (DIM) with DOTS from Domain B, and DIM may be used to exchange credentials authorizing Service-to-Service interactions.

In an example, service operations with the DM service instantiation approach discussed above, as used in an OCF network implementation, may include aspects of discovery, authorization, and device resource instantiation operations. As a first example, discovery operations may include configuration of a service resource(s), such that the service resource(s) are made Discoverable when instantiated, and Non-discoverable when de-instantiated on the device hosting the service. As a second example, authorization to perform a service may include use of a sequence of operations, such as: (1) DOTS issues a role credential naming service—(e.g., ocf.role.-service_type_name-); (2) AMS (Access Management Service) creates ACE entries on devices requiring the service; and (3) CMS (Credential Management Service) creates credentials for devices requiring the service. As a third example, device resource instantiation may be performed as the DM service utilizes CRUD commands to CREATEs companion Resource(s) on a Device, and DELETEs/CREATEs/UPDATEs companion Resource(s) if previously instantiated.

As a specific example of a DM service in an OCF network implementation, a DOTS onboarding service may be instantiated and operated. For instance, the initial (first instance) DOTS instantiation may include issuing self-signed role certificate(s) for all DM services available at this domain, and creating a domain identifier (UUID). The peer (second instance) DOTS instantiation may include the initial DOTS service performing service instantiation and delegation actions for a peer DOTS service. The subordinate service instantiation may include the DOTS service performing a service instantiation and delegation actions for a CMS, AMS. Mediator, or other DM services.

In a specific OCF network implementation, a DM service abstraction may be defined with the following properties:

- Is a OCF Device
- Has a Bundle/Collection (or Constrained Collection) of Resources unique to the Service
- Has a Set of Actions that it performs
- Has a Role Credential authorizing it to perform the Service
- Has a Peer OCF Service of the same type as its collaborator (optional)
- Has a Subordinate OCF Service that it can delegate to (if service_type permits) (optional)

In an OCF implementation, before a specific device becomes operational in an OCF environment and is able to interact with other devices (and affect services operating on such devices), the subject device needs to be appropriately onboarded. The first step in onboarding a Device is to configure the ownership with an onboarding tool (OBT) and use one of the Owner Transfer Methods (OTMs) in the OBT to establish ownership. Once ownership is established, the OBT becomes the mechanism through which the subject device can then be provisioned; and ultimately, the subject device becomes operational and is able to interact with other devices in an OCF environment. The results of this scenario, which can be further used to launch DM services from a subject device, is further detailed in the following illustration.

Figure 4:
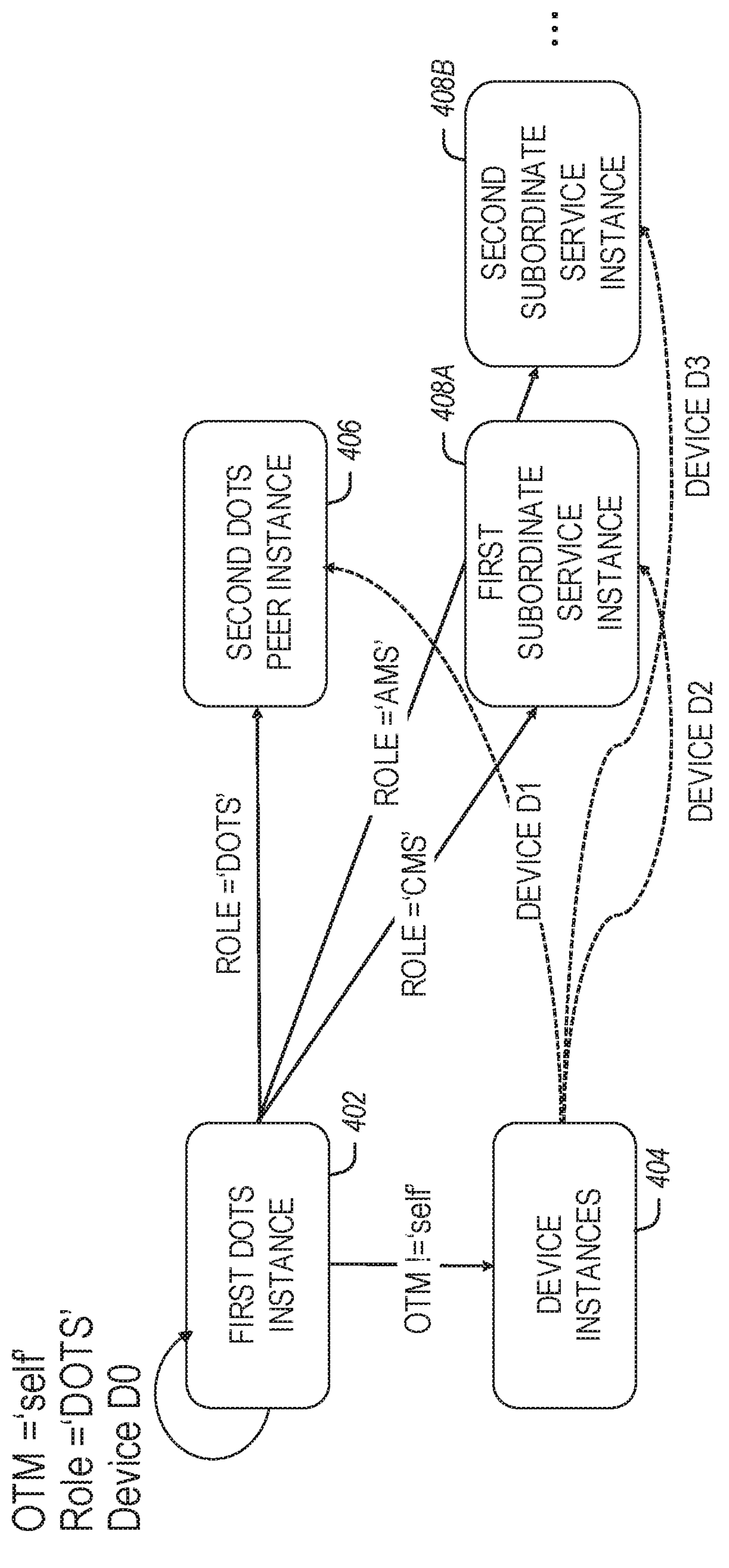
FIG. 4 illustrates a deployment of a device management service instantiation model, according to an example.

FIG. 4 illustrates an example deployment of a DM service instantiation model with a DOTS DM service, for instantiating and operation of multiple DM services. As shown, a series of operations are launched, commenced with a first DOTS instance 402 instantiating itself, and establishing its role as a DOTS service, as device D0. This satisfies a first DM objective of onboarding a first Device, as a pre-requisite to instantiating a DM service and other devices. In this example, the first DOTS instance 402 (device 0) is established as a superior DM service. Additionally, the first DOTS instance may issue a self-signed role certificate(s) for all services available at this domain and create a domain identifier (UUID) used for identification and management operations.

Additional operations are initiated from the first DOTS instance 402 (the superior DM service) for configuration of other devices. This includes onboarding other device instances 404 (Devices D1, D2, D3) which are launched to operate as other DM subordinate and peer DM services. The operations launched from the device instances 404 also result in achieving a second DM objective of instantiating a first "peer" superior DM service instance 406, also operating as a DOTS service. In a further example, a DM service may dc-instantiate a peer or subordinate DM service by some combination of expiring a role authorization, or removing a DM service-specific set of resources and actions.

Further, a DM objective to perform a subordinate service to a managed device may include lifecycle management of credentials, access lists, device onboarding, and the like. Other DM functions may exist related to management of subordinate or peer services and devices. As shown, a first subordinate service instance 408A may be instantiated, such as to take on the role of a CMS (credential management service); a second subordinate service instance 408B may also be instantiated, such as to take on a role of an AMS (access management service). The instantiation of the instances 408A, 408B, achieves a third DM objective of instantiating a subordinate DM services. Thus, in the example of FIG. 4, DOTS performs service instantiation and delegation actions for CMS, AMS. Mediator, or other forms of services.

In a scenario involving DC and/or ZC resources, the device hosting the DC may also have a self-signed and self-issued role. In this example, the DOTS is likely to operate as a subordinate service that is delegated along the same lines as is described for CMS and AMS. Further, the example shown in FIG. 5A and discussed below shows the /oic/svc/domain resource which is a resource that logically belongs with a DC service abstraction in a scenario where the DC and/or ZC are de-conflated (separated) from the described DOTS service. Similarly, resources such as/oic/svc/dots/mytrusteddevices and mydelegations may be associated with a DC or ZC service (e.g., /oic/svc/dc/mytrusteddevices)

In a further example, DM services that are defined in terms of an OCF Resource model may inherit other properties of the resource model useful for management of resources, such as the aspects of an "array", "collection", or "bundle" of a defined group of a plurality of resources. For instance, a DM service resource may inherit properties from a bundle resource (as one of its building blocks) to experience more reliable and safe operation. With use of a bundle resource, referential integrity violations may be minimized, resulting in fewer aborted or partially applied device management operations.

For instance, an OCF service bundle may be represented as a bundle (e.g., array, collection, or group) of resources that facilitates a prescribed interaction between a managed device and its service. This bundle may include two sets of resources: a service side and the managed device side. An OCF service bundle may include: (a) service-side resources that contain data and actions this service implements: (b) an identification of Device-side Resources to be managed; (c) properties controlling the service's scope (e.g. peers, subordinates, and the like); and (d) role and service type (e.g., "oic.role.svc.name", "oic.svc.name"). Further, an OCF service bundle may include actions as code (e.g., functions the service implements) or as a Resource (e.g., with a definition of the action resource type and name, such as an array of "<Seq_#><CRUDN_Action><Role><Target_Device><Interface><Resource><Predicate><Next_Action>", where the Sequence of Actions achieves an expected objective (e.g., "onboarding"), the final <CRUDN_Action>"commits" the sequence of actions as complete, and failure to "commit" the sequence results in replacement of the pre-sequence resource replacing the affected resource). Other examples of OCF service bundles and collections may allow variations to these properties.

FIGS. 5A-5D illustrates an example listing of resources and companion resources for onboarding, credential management, and access management DM services, for use in an OCF network implementation. Companion resources are resources provided by the managed device with which the particular DM Service interacts.

Specifically, FIG. 5A illustrates a set of DOTS resources 502 and DOTS companion resources (resources 504 on a peer DOTS service and resources 506 on a trusted device). In an example, these resources may be used to support the following DOTS actions:

Owner transfer methods (onboarding) and offboarding
Provisioning of Security Virtual Resources (SVRs) at onboarding
Soft Reset (SRESET) processing
Issue Role creds for OCF-defined services (e.g., ocf.role.svc.dots, ocf.role.svc.cms, . . . )
Local CRUDN operations on DOTS Resources
CRUDN operations on/doxm and/pstat Resources
CRUDN operations on Delegate Services
CRUDN operations on Peer Services
CRUDN operations on Foreign DOTS Services FIG. 5B illustrates a set of DOTS resource model resources (resources 512) and child resources (resources 514). As noted above, such resources themselves may be represented by a bundle (e.g., array, collection, or group) with respective properties and values.

FIG. 5C illustrates a set of CMS resources (resources 522), resource model resources (resources 524) and child resources (resources 526), and CMS companion resources (resources 528). In an example, these resources may be used to support the following actions:

Local CRUDN operations on CMS Resources
Credential life cycle
Create, Delete, Update, Notify, Issue, Revoke, Refresh, Expire FIG. 5D illustrates a set of AMS resources (resources 532, 534, 538) and AMS child resources (resources 536). In an example, these resources may be used to support the following actions:

Local CRUDN operations on AMS Resources
ACE lifecycle management

Create, Delete, Update (Subscribe), Notify (Publish), Sign, Expire etc. . . .

It will be understood that the listing of these resources and actions are provided for purposes of illustrating how various DM services may be implemented and used, and other types and forms of actions and resources (including in non-OCF network settings) may be implemented with use of the present approaches.

Figure 6:
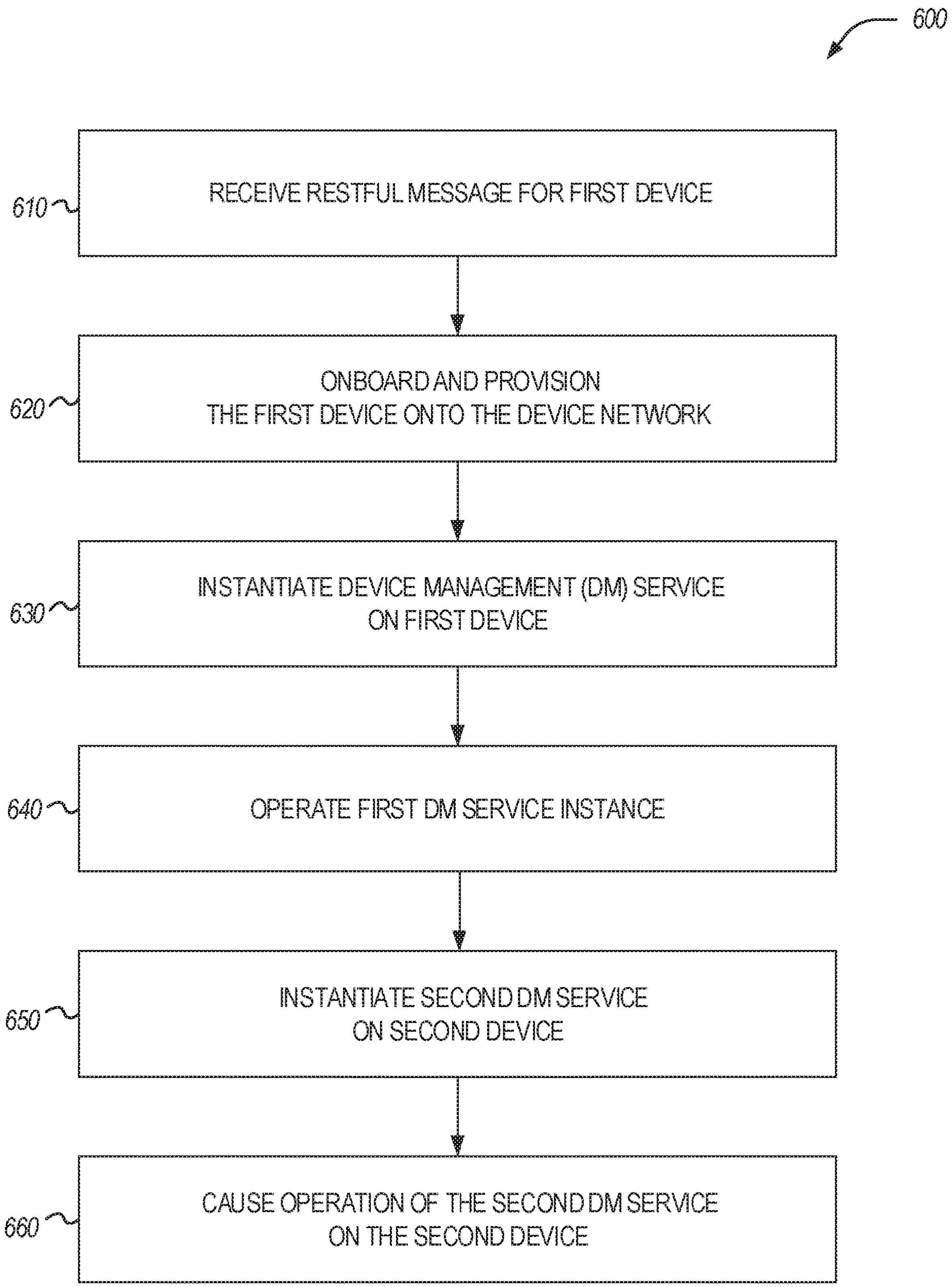
FIG. 6 illustrates a flowchart of a method for establishing a device management (DM) service configuration in a device network, according to an example.

FIG. 6 illustrates a flowchart 600 of an example method for establishing a device management (DM) service configuration in a device network, such as an IoT network configuration operated according to an OCF specification. In an example, the operations of the flowchart 600 may be implemented by a single device, distributed operations among multiple devices or systems, or other functional implementations.

The flowchart 600 commences at 610 with operations of receiving the RESTful message at a subject device (also referred to as a first device), such as in an example where the RESTful message comprises a CREATE message. Based on this message, resources are created (or updated) on or for the subject device. Additionally, in some examples, resources are created or updated for or on a second subject device, such as based on the CREATE message, which allows instantiation and operation of a service instance as discussed in the following examples. In further examples, such resources are expressed in an array, collection, or bundle of resources, such as may be managed with the operational examples of FIGS. 7 to 10. Also in further examples, the second device is a member of a trusted device collection, and still further, the trusted device collection may include an array of resource model properties that is used to define properties of operation for a first DM service instance (as instantiated in the following operations).

The flowchart 600 continues at 620 with onboarding and provisioning the subject device onto a device network, as an initial step in response to the receiving of the RESTful message by the device. As a result, the following operations of instantiating the first DM service instance occur after the onboarding and provisioning. In some examples, after the operation 610, other operations may include receiving a second RESTful message, such as with the use of an UPDATE or DELETE message, which involves modifying the operation of the second DM service instance (instantiated in the following examples based on the second RESTful message).

Instantiation of a DM service on the first and second device may occur with one of the following variations. In the flowchart 600, the operations at 630 and 640 involve instantiating, at the subject device and in response to receiving a RESTful message by the subject device, a first device management (DM) service instance, and then operating this first DM service instance. This is followed at 650, with instantiating, at a second device and in response to the receiving of the RESTful message, a second DM service instance, based on a request provided from the device to the second device. This is followed by causing the operation of the second DM service instance at 660, based on the request provided from the device to the second device.

In some examples, the first DM service instance and the second DM service instance operate in a same DM service role, such that the second DM service instance is established as a peer service instance of the first DM service instance. In other examples, the first DM service instance and the second DM service instance operate in different DM service roles, such that the second DM service instance is established as a subordinate service instance of the superior first DM service instance. For instance, a subordinate service instance may be one of a group of subordinate services instances defined in a domain, with such subordinate service instances and associated devices being controlled or established by the superior first DM service instance.

Additionally, in some examples, operational control of the first DM service instance may extend to configurations involving domains and zones. This may occur in a setting where DC and ZC have essentially the same properties as the "first DM" service instance but where the roles of DC, ZC, and DOTS are separate and where all the various DM service functions and roles can be dynamically and flexibly in different configurations. This enables a deployed OCF device to perform ancillary service functions while continuing to perform a primary function envisioned by a device manufacturer. (For instance, a refrigerator could be configured by its user to be a domain controller, onboarding service or other service). Moreover, such first/second service instance configurations may occur in settings where services functions are flexibly configured by the user (post device manufacture).

IoT frameworks such as OMA LWM2M and OCF IoTivity define a data model abstraction for representing, accessing and interaction with IoT devices. An assumption of such frameworks is that IoT devices are physically instantiated by a "device manufacturer" and therefore the device abstraction is defined and known a priori. Cloud services, IoT network gateways and virtual machine environments that host IoT frameworks must instantiate the device model using an application, object management tool or console that is outside the IoT framework. Interoperability, security, and device lifecycle are more difficult as a result. For example, a vendor of IoT network management tools typically cannot perform object management operations without first collaborating with the original device manufacturer (ODM).

ODMs typically provide network management and device lifecycle management tools that are informed by the ODM's shipping devices. Because the ODM knows which devices it manufactures, the ODM typically is best able to produce device lifecycle applications and tools. As a result, independent vendors of IoT lifecycle management tools, gateway vendors, and cloud service providers are often unable to supply solutions that provide improved solutions and user experiences. For example, such vendors are unable to easily dynamically instantiate virtual devices for uses such as network isolation, edge services, load balancing, and optimization.

In addition, in some approaches of existing IoT network implementations, an unsuitable data structure may be used to define sets and groupings of resources. For example, in OCF specification networks, a list or array of resources (e.g., HREFs) to other resources is defined as a "collection". A collection data structure is useful for creating a mesh of connected devices; however, because an HREF may refer to some other device, outside the intended device, this presents a security challenge. Further, extensive application code is often deployed to in an effort to create virtual (e.g., logical or shadow) devices and the collections of such devices.

The following techniques may be applicable to address these and other limitations of conventional IoT network configurations. In an example, techniques are discussed for the creation and instantiation of collections (arrays) of objects within a network abstraction, without the overhead required for HREF references to external resources. In an example, objects (e.g., Devices and Resources) may be dynamically instantiated based on the use of object interaction interface, such as a CRUDN (create, read, update, delete, notify) or CRUDPS (create, read, update, delete, publish, subscribe) object interface. In a further example, new objects may be instantiated using a type reference, but without requiring the specification of a name; instead a parent object (which is hidden) may generate/assign a name. As a result, a client may be provided with the ability to refer to one of a set of child resources that are on the local device, without having to establish a reference through a parent resource.

In a further example, objects of a mixed type may be elements of the same array or set. However, the parent object may restrict which mixture of objects is permitted using a meta-property that may be hidden from the calling client (but may be visible to an administrative client). In still a further example, meta-properties associated with the parent object may specify additional constraints such as whether or not member resources may have local properties rather than being remotely linked. This may allow improved control of resource caching and load balancing.

For purposes of understanding the presently disclosed techniques, the following resource management techniques provide reference to certain interfaces within an example OCF network implementation. It will be understood that variations to the following network implementation and components, and the use of additional or alternate network components, within other standardized or non-standardized deployments, are within the scope of the present examples.

Specifically, in an OCF network implementation, the following techniques may be implemented as an improvement to a Collection resource, in the form of a "constrained collection". In an example, such a constrained collection is a modified form of a Collection resource that includes the following limitations and capabilities: Only local (child) resources can exist (e.g., no off-device hrefs); the parent resource is protected; an Iterator resource is a default member of the Collection: and "Child" member resource(s) are directly addressable. In an example, the parent resource is protected because the collection resource is visible only to clients with special rights (e.g. 'admin'); the collection resource does not support the 'hba' (batch) interface; and parent resource properties (other than its child resources) are accessed through the parent resource, whereas CREATE. DELETE of a child resource are processed by the parent resource (with proper rights). Also in an example, the Iterator resource walks the parent resource, revealing metadata about child resources; further, a collection may have multiple Iterator resources as appropriate to satisfy various use cases. In a further example, an Iterator also may be used to obtain an href to child resources.

Figure 7:
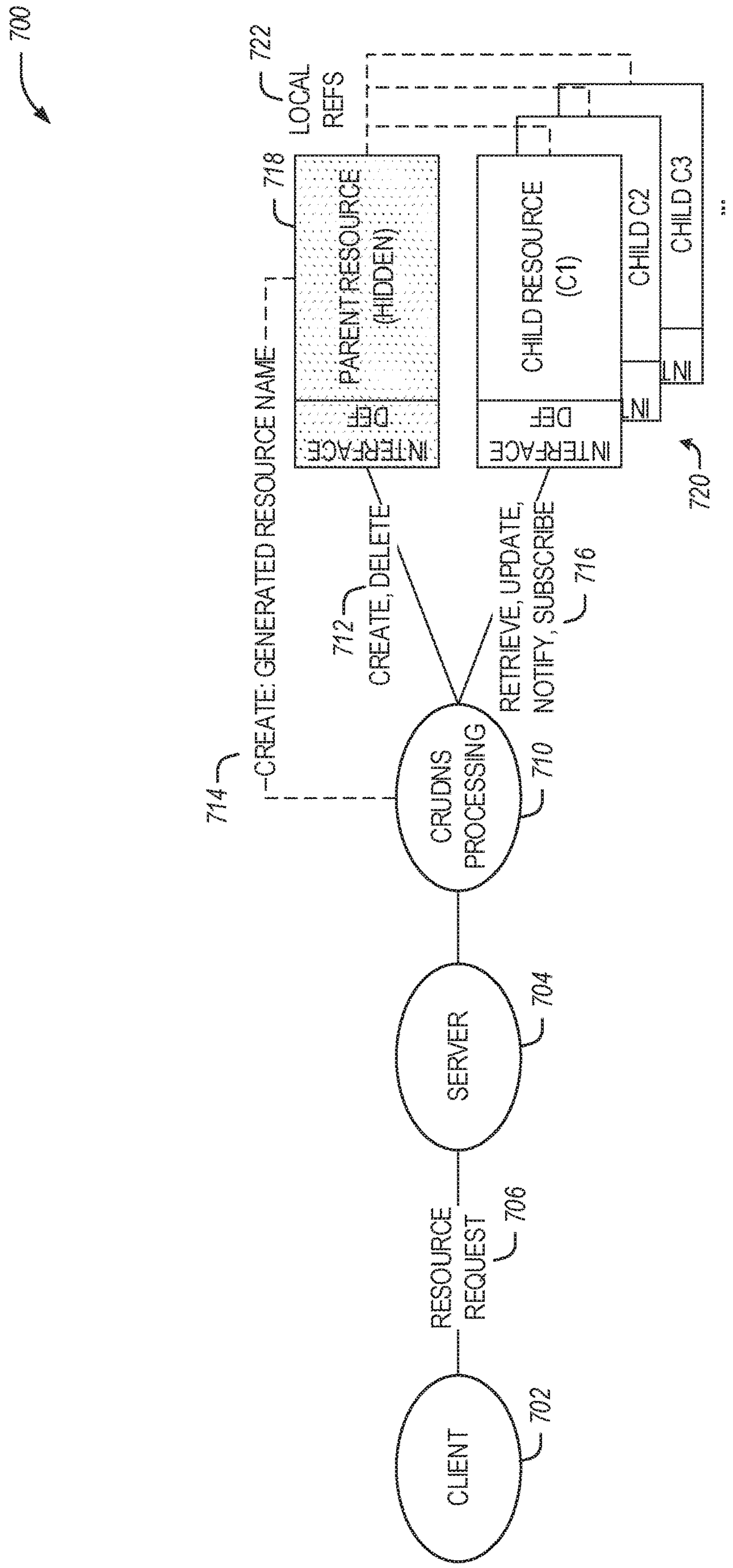
FIG. 7 illustrates an overview use of a client-server architecture configured for representing an array of resources, according to an example.

FIG. 7 illustrates an overview use of an example client-server architecture 700 configured for representing an array of resources. In an example, an array of resources may be managed through a CRUDN or CRUDPS message(s) by using a hidden parent resource 718 that maintains the linkage to the child resources 720. Such CRUDN or CRUDPS message(s) may be provided from a server 704 in response to a resource request 706 from a client 702.

In operation of the client-server architecture 700, CREATE and DELETE messages 712 are vectored by CRUDN/CRUDPS processing 710 to the parent resource 718 that links or unlinks the child container resource as appropriate. For instance, a CREATE command 714 may also result in the parent resource 718 generating a resource name that may be used externally to refer directly to the created resource. Additionally, the parent resource 718 may register the name with a directory resource or may return an Iterator resource (not shown, but further discussed below) that may be used to access child resources by their position. In a similar manner, RETRIEVE, UPDATE, NOTIFY (Publish) and SUBSCRIBE messages 716 are directed to the named child resource 720 where the interface definition semantics normally defined are applied.

Based on the usage of the architecture 700, a resource may be created and instantiated using a CREATE or DELETE message 714, while applying appropriate action(s) to the hidden resource parent 718 (e.g., the parent that is maintaining the reference to the child resources). In a further example, the parent may be responsible for creating the name, such that a parent may use a naming algorithm to generate a reference 722 in response to a request to create a resource of a particular resource type. For instance, a parent may generate a UUID value as the name of the resource; this value may be returned to the client 702 and returned to the server 704. In still another example, the use of a self-sovereign identity may be employed, such as with the parent resource 718 generating a self-sovereign identifier of a particular device. In still a further example, the use of a blockchain record may be involved for the generation and use of an identifier.

Figure 8:
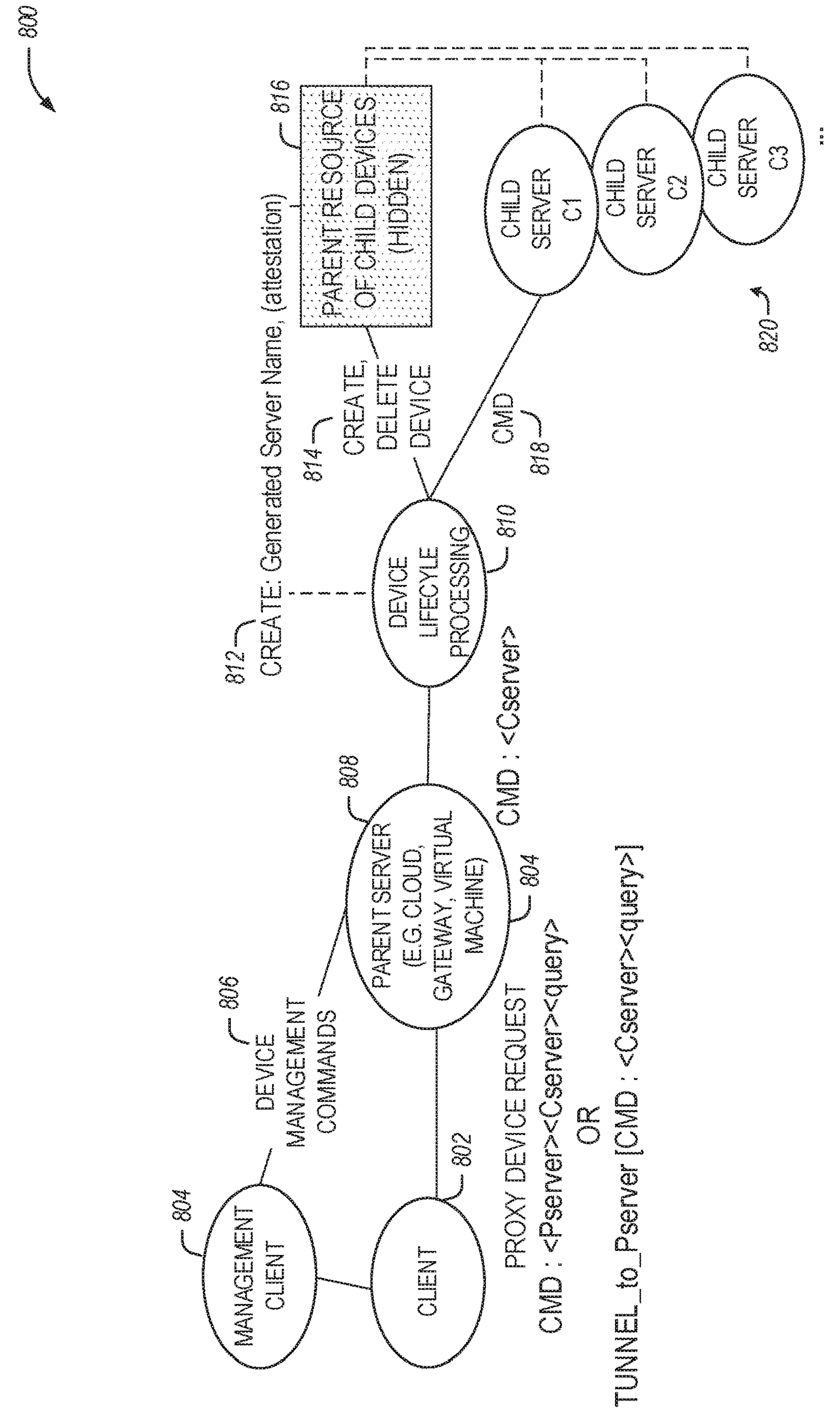
FIG. 8 illustrates a management use of a client-server architecture configured for representing an array of resources, according to an example.

FIG. 8 illustrates a management use of an example client-server architecture 800 configured for representing an array of resources. In the example of FIG. 8, IoT devices may be treated as a "device" resource where devices are manufactured programmatically according to IoT CRUD messages. Cloud servers, gateways and virtual machine environments have need of managing "soft" IoT devices that may perform proxy operations on behalf of a physical device in another network or to perform computational or control operations where optionally no sensing or actuation using physical sensors/actuators is necessary.

In an example, a parent resource 816 maintains a list of "device" (child device) resources 820 where all the resources comprising an IoT "server" device may be maintained. A client request (e.g., a command 806, from client 802 via management client 804) to an edge device (e.g., a Parent Server 808) intended for a child server (e.g., one of the child servers 820 C1-C3) may be routed or forwarded by the device lifecycle processing 810 to the "child" for processing as a command 818. Normally, a messaging protocol such as COAP may be used to perform CRUD. CRUDN or CRUDPS operations. These are normally routed to the endpoint server directly. However, in the case of an edge, cloud, or gateway environment, the edge, cloud, or gateway device may be the named entity in the IoT message. The cloud, gateway, or edge device (e.g., parent server 808) may re-route the message to the child device as appropriate. The originating client (e.g., client 802) may be aware of the child device and construct a command including the child device name in the command construction. For example, the command structure may include both the routing device and the endpoint device authority structures:

CMD <Parent_muing_device_ID><Child_target_device_ID> <comnmnd_suffix>

Alternatively, the originating client (client device) 802 may establish a dedicated communication path to the Parent/routing device (parent server 808) where commands arriving over the channel are expressed in terms of the target child device. In this way, the command syntax need not be modified.

The device lifecycle processing 810 may also handle a CREATE or DELETE command 814 to respectively create or delete a device with the parent resource 816. In an example, the CREATE command 812 may be interpreted by the device lifecycle processing 810 as a request to create a device, whereas conventionally only ODMs would create devices. The parent device (parent server 808) consequently may take on the role of device manufacturer (logically) and generate a device name (e.g. UUID, href, network IP address) as appropriate and register the new device in a parent resource (parent resource 816) containing references to the generated devices (a new device to add to devices 820). Further, the parent device 816 may include an attestation of the physical platform/parent device to accompany the created device.

The presently described creation, definition, and use of an array resource in such ways provides a different approach when considering manageability operations. A conventional approach for management often involves use of a management console at a dedicated PC, establishing a connection over a protocol dedicated for management (e.g., SNMP), and using a dedicated management engine and baseband management controller. Through such configuration, a console may be utilized to perform trusted or necessary operations on the server (e.g., to launch a set of manageability agents that are tied to management capabilities, to perform operations and application control through a management console).

The present techniques enable an IOT framework to be used for such management operations, in lieu of a complex management architecture. A management client (e.g., client 804 depicted in FIG. 8) used with the present techniques operates in a similar manner as a management console; however, instead of connecting to a management engine, the management client connects to the server in the same way that the server connects to a client for a CRUD operation. This means that IOT commands may also be issued in the same way as a client-using the same abstraction—and appropriate management functions up to and including the creation of resources to be executed.

Figure 9A:
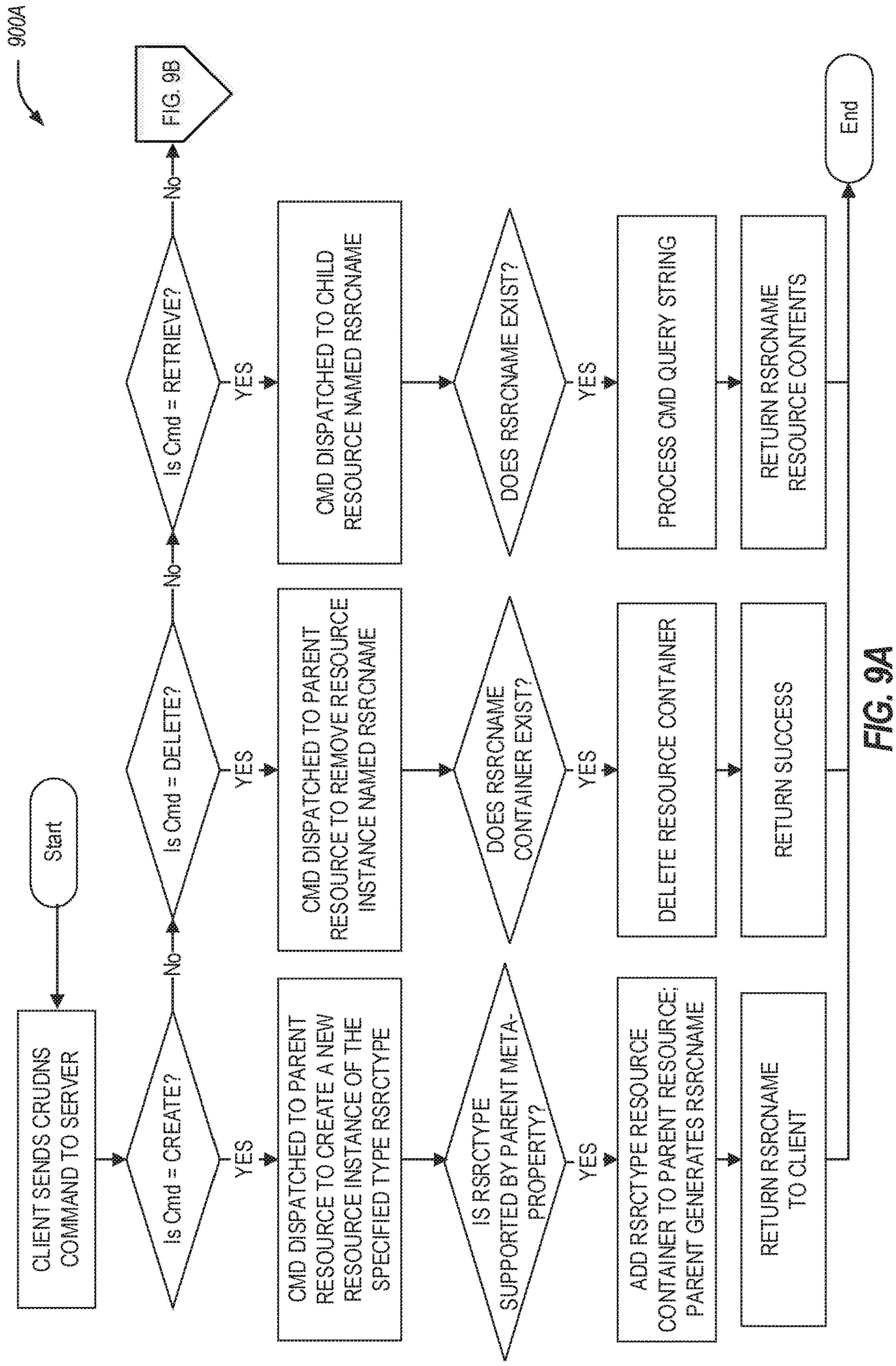
FIGS. 9A and 9B illustrate processing flows of client commands used with an array of resources, according to an example.
Figure 9B:
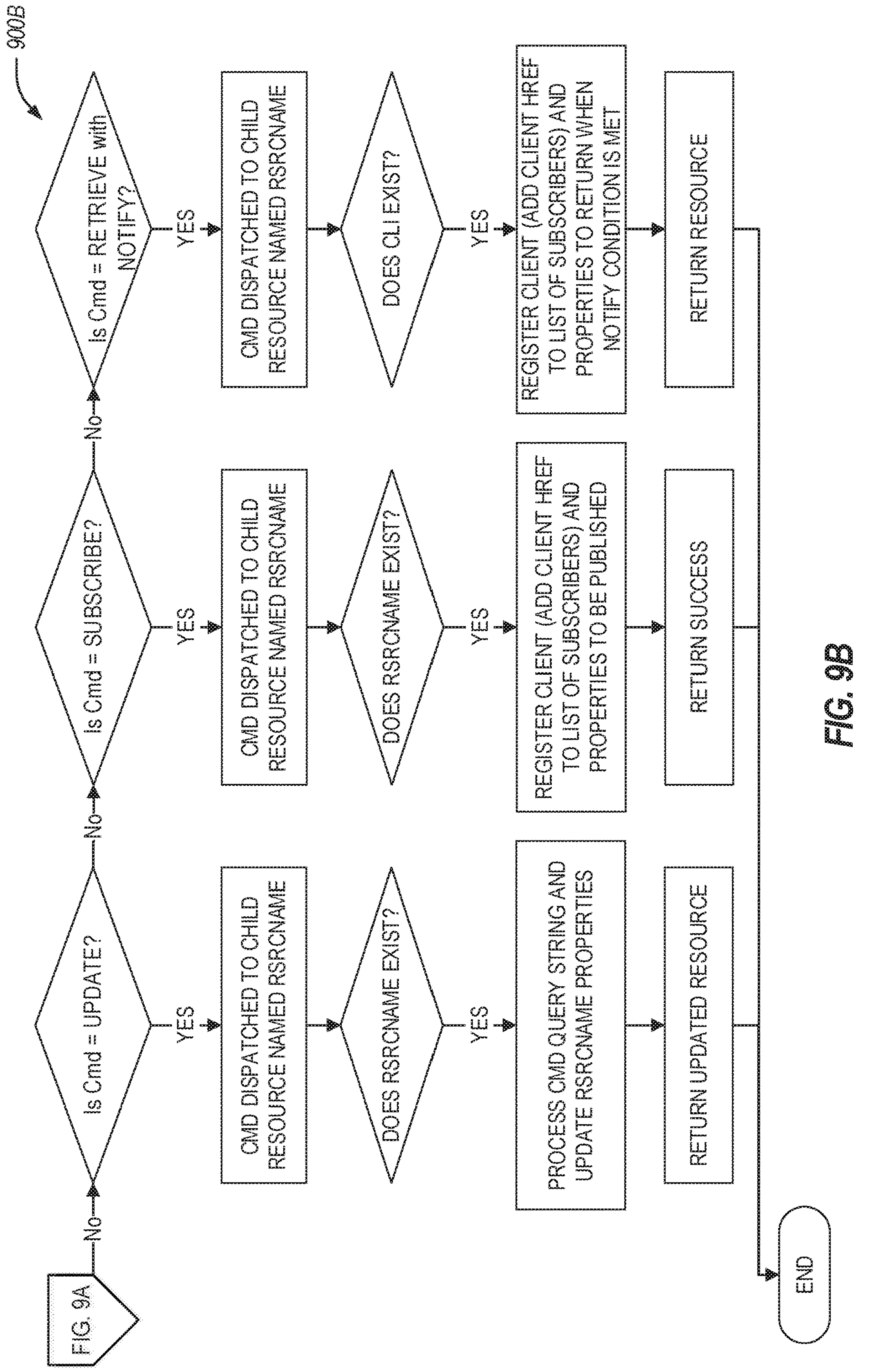

FIGS. 9A and 9B illustrate example processing flows 900A. 900B of client commands used with an array of resources. Specifically, processing flow 900A illustrates processing for CREATE, DELETE, and RETRIEVE commands, whereas processing flow 900B illustrates respective processing for UPDATE. SUBSCRIBE, or RETRIEVE with NOTIFY commands. As shown, such processing actions may be performed by either a parent or a child, depending on the command type and actions to be performed.

The CRUDNS command processing flows 900A. 900B illustrate respective operations where, for each command, an appropriate action is taken to maintain the list of devices using a hidden parent resource. In particular, the CREATE and DELETE commands are vectored to the parent as appropriate to instantiate/de-instantiate the entry while the other commands are vectored to the specific child resource for processing.

In an example, IoT object models may define interface semantics that describe how clients may interact with the resource. Typically, this involves definition of CRUD. CRUDN or CRUDPS behaviors. The resource name and command disambiguates which interface semantic to apply. In the case of CREATE, the name does not yet exist, and therefore a hidden parent resource is used implicitly. The client issuing the CREATE command may specify a resource type parameter, which instructs the parent to generate a resource name. Optionally, the client may supply a resource name.

In a further example, an Iterator resource may be defined to provide a flexible way to interact with an array or collection of resources. An Iterator resource may be utilized with an array defined with the techniques above, to allow serial access (e.g., to access a next data value in the list, and each time to get a request to return the next one).

In an example, the Iterator object may be defined to return a "Next" resource in the array of child resources. As an example invocation of an Iterator, the following example commands may be defined as:

GET <Server_ID>:/Iterator/Next (where the returned value is the resource name and type); or GET <Server_ID>:/Iterator/[0,1,2,3 . . . n] (where the index value corresponds to the position of the Child resource in an array).

The use of an Iterator resource has flexibility beyond that of a named Parent resource, because multiple Iterators may be defined having specialized semantics. For example, an Iterator may present a serialization abstraction for processing arrays of certain resources or types of resources. Another Iterator may present a binary tree abstraction. Other Iterators may provide resource type filtering such as all resources of type (e.g., "temperature").

Iterator resources may be used in connection with device resources to enable cloud server, gateway, and edge devices more flexibility and security in interactions with clients. For example, a gateway device may define an iterator for revealing "water pump" devices but not "centrifuge" devices. The querying entity is not required to know about "water pump" device types in order to receive a listing that contains water pumps. If the cloud, gateway, or edge device no longer wishes to expose water pump devices externally, it may simply remove the Iterator that reveals water pump devices. When a client interacts with the gateway next, it obtains Iterator resources, but does not find the "water pump" device iterator. This approach is more flexible and secure over existing directory resources that normally provide an exhaustive list of all resources and present a single structural abstraction (e.g. array) for representing the resources.

In an example, an Iterator may be structured as a tree or in other formats appropriate to a network. Thus, in contrast to techniques which involve going to a directory (e.g., /RES) that serializes everything and provides an entire array (a huge data structure that has everything in it), an Iterator may provide a limited data set. Thus, an Iterator may be particularly appropriate for use in constrained devices, with the use of a query to define and appropriately restrict data set results.

As discussed in the examples above, a device may be expressed as a collection resource, and this collection resource may be described as an "array" of references (e.g., hrefs) to the local mandatory and optional resources that every IoT device may include. Thus, a device may be established with a parent collection, which serves as a constrained collection because this collection does not refer to resources instantiated remotely. In an OCF implementation, an OCF Device may implicitly have a constrained collection resource for the resources that the device hosts, or may explicitly use a constrained collection structure to represent an OCF Device. Device management would also recognize the parent (collection) resource by its device name, such as from the device ID.

Further in an OCF implementation, a constrained collection may be defined to include at least the following mandatory resources:

/itr—an Iterator resource that is read-only

/links—an array containing child resources that is not directly accessible

All resources mandatory for an OCF Device (e.g., Id, which is a resource that exposes device properties such as device names, aliases, or identities).

In an example, an OCF Device may have an implicit constrained collection where the parent collection is hidden and where a first iterator resource (/itr) may be hidden and a second iterator resource (/res) may be accessible according to an existing definition of said resource.

The use of the/res Iterator resource differs from revealing the parent collection, since there is no name construction that performs this action in existing OCF approaches. Further, the use of the/itr Iterator resource or a similar Iterator construction may apply to any number of device management, routing, gatewaying, bridging, or proxying use cases, where special permission is required to access the parent collection directly.

In an example, the properties of a constrained collection in an OCF implementation may include the following properties:

href (e.g., <authority_x>/<cc_name>)

rt (e.g., cc_type)

rts (e.g., "rt_A". "rt_B" etc. . . . )

if (e.g., 'oic.if.c (create a child resource in the parent collection resource); 'oic.if.d' (delete a child resource in the parent collection resource); 'oic.if.itr' (retrieve a listing of the child resources maintained by the parent collection resource) and where other interface semantics do not apply to the array of child resources including Read 'oic.if.r', Write 'oic.if.rw', Batch 'oic.if.b'; and the like)

Itr (i.e. iterator resource reference)

In an example, the values of a constrained collection in an OCF implementation may be defined as an array-of-child-resources, where each has a directly accessible href, for example:

[1] href="<authority_x>/r1"

[2] href="<authority_x>/r2"

[3] etc. . . .

In an example, the values of the access control entries (ACEs) for a constrained collection resource may utilize properties similar to the following:

[1] "</cc_name>: CRUDN: <client_A>

[2] "/r1": CRUDN: <client_B>

[3] "/r2": CRUDN: <client_C>

[4] etc. . . .

In a further example, security resources (e.g., mandatory resources) of a constrained collection may include:

/doxm—security properties of the device including device ID

/pstat—device status properties

/cred—Collection or list of credentials maintained by the device

/acl—Collection or list of access control policies maintained by the device

/roles—Collection or list of roles supported by the device and enforced on a current connection In an example, the supported/cred resource may support different types of credentials (role, asymmetric, symmetric, etc.), and credential type-specific interfaces: as a result, each entry may have its own ACL, and credentials need not be disclosed to clients without a need-to-know. Also in an example, the supported /acl resource may have each entry as observable; further, /acl resource entries pertaining to a particular class or location may be partitioned for more scalable management.

In a further example, optional resources of a Collection may include:

/mnt—A resource that exposes 'maintenance' properties.

/rts—An iterator resource that lists the various resource types implemented by this device.

/ifs—An iterator resource that lists the various resource interfaces implemented by this device.

/mon—A resource that exposes 'monitored' properties (those that support Notify behavior).

Other security resources such as revocation lists.

Any number of "vertical resources' that implements a particular function of a sensor or actuator or controller such as a light switch or thermostat.

In an example, an Iterator resource may have a read-only interface "oic.if.r" that also has an ACL that grants read-only access to the Iterator resource. With this setting, no update interface is defined and no ACL policy can grant Update access.

Also in an example, if the iterator resource is not well known and is not discoverable, then the Parent resource may be used to access the iterator using an iterator interface type aka 'oic.if.itr'. This approach only applies to the iterator child resource and only supports read.

Also in an example, create and delete of child resources is accomplished using CREATE and DELETE commands delivered to the Parent resource where a 'create' interface is used (e.g., 'oic.if.c') where the action to create a child resource applies to the Parent's Array structure containing a list of Child resources. For instance, CREATE via 'oic.if.c' adds a new Resource to the array of child resources. Internally, this results in an update to the array of Resources—DELETE is the reverse operation and uses a 'oic.if.d' interface. The iterator may reflect the effects of CREATE and DELETE operations when subsequently queried. (Note: These are special cases of a batch interface semantic (e.g., 'oic.if.b') but do not apply to the child resources themselves, nor do they apply to the parent resource). Additionally, the parent resource may be created and deleted by applying the above method to a grandparent collection resource that contains the parent resource as its child.

Also in an example, an OCF Device may use the Device UUID as the name of the grandparent collection resource. A traditional Collection may be used to refer to a grandparent Resource on a peer node/Device using an existing URI reference of the form <DeviceID>/<DeviceID> where the second DeviceID instance names the Grandparent collection explicitly and where <DeviceID>/<DeviceID>/res names an iterator resource of the grandparent resource. An implicit reference to a grandparent collection on an OCF Device may also follow an existing naming convention of <DeviceID>/res where /res resource is a well-known resource name.

In a further example, services of a constrained collection may be defined. A service is a resource that contains a set of actions or scripts containing restful (e.g., CRUDN/CRUDPS) commands that achieves a prescribed outcome. A collection may also provide a resource that the device receiving services uses to interact with the service, such as how to locate the service (e.g., call setup, etc.). (A further discussion of an action resource for use with a service is discussed below). In an example, services of a collection may include:

/rd (update_only)—Note that updating/rd does not result in the creation of new resources, and/rd actually supports a device "service" which is a concept supported by UPnP. Update-only may also include off-device references to resources on other devices /obt—Onboarding service—properties for identifying how to connect to the onboarding service /obts—Script resource containing various onboarding operations /cm—Credential management service connection establishment /cms—Script resource containing various credential management operations /am—Access management service connection establishment /ams—Script resource containing various access management operations /cloudconf—Cloud service connection establishment /cloud—Script resource containing various cloud services operations In a further example, other "intermediary" functions may be performed in an end-to-end exchange between endpoint devices. These may include:

Caching proxy—an intermediary that is a "device" and may maintain state such as whether a switch is on or off, but is not a physical device. Rather, a caching proxy maintains a connection to a backend physical device and synchronizes state with the device (eventually) as connectivity permits. For example, the caching proxy could be a roaming platform that cannot always be connected to the backend device. The caching proxy may be expressed as a Collection resource with local resources and a synchronizing backend.

Proxy—an intermediary that does not maintain state. A proxy requires a connection to the backend device. In an example, there is a 1-to-1 mapping of front-end resources to backend device resources.

Bridge—A collection of Proxy or Caching Proxy devices.

Gateway—A collection of Proxy or Caching Proxy devices where the backend performs data model translations, for example, from OCF to LWM2M/Alljoyn/OneM2M, etc.

With the techniques discussed herein, Gateway, Bridge. Proxy, or Caching Proxy device types may be established as collections to be hosted on OCF Devices, meaning that the host itself may appear as an endpoint device. In addition, such Gateway, Bridge, Proxy, Caching Proxy device types may also operate as "services". Restated, each of these logical devices may be explicitly expressed as Collection resources and collections of Collection resources. This configuration allows a formal data model expression to be evaluated for correctness. This configuration also allows an access control capability (such as an /acl resource) to be used to enforce access control policies on the devices discussed above. Further, access control would apply to even new forms of devices. This enables a scalable, yet flexible, security capability for IoT networks and network permutations.

Based on the examples discussed above, the parent collection resource created with the present techniques may be "hidden", although there may be various device/service/intermediary management scenarios where a privileged caller (aka admin console/client) may wish to use a RESTful CRUD, CRUDN, CRUDPS command to perform device management. In these scenarios, OCF specification approaches may be modified to allow a href pointing to the parent to also refer to the child. In the case where the child resource is a "device" there needs to be a way for the device ID to become the resource name. This may be achieved by allowing resource names that are UUIDs.

As an example, consider the command: Coap: GET <Parent_Device_ID>/<Child_device_ID>/<resource_name><optional_query_command>. A benefit of allowing Child_Device_ID as a resource name, allows a href that traverses the various layers of network topology to reference the specific resource endpoint. For example, given a network topology that is structured as Bridge→Caching_Proxy→Device→Lightbulb, the href construction may be established as: Coap: GET <Bridge_UUID>/<Caching_Proxy_UUID>/<Device_UUID>/<Lightbulb>

The Security model could follow the href by specifying ACLs for each resource referenced in the path. For example, an ACL could be configured on each of the Bridge, Proxy. Device and Lightbulb resources that names the Coap Client (caller). If the secure channel/message authenticates the caller to any of Bridge, Proxy, Device, then the href may be used to match the caller to the appropriate intermediate node (which becomes the enforcement point for access). This is important because security goals of end-to-end security may tunnel through intermediaries until an appropriate secure channel endpoint is identified. Thus, an ACL may exist that appropriately identifies the caller as the entity that has traversed the network topology path outlined in the href (identified above). It also means that if a hop-by-hop security is in use where data are in the clear at each hop may rely on the href to identify the expected network topology path and verify that path was followed by referencing audit logs that each intermediary is keeping. (For example, gateways that perform data structure mapping must be a secure channel endpoint). Audit log files also may be made available through the RESTful interface such that a subsequent intermediary could query the previous intermediaries audit log resource to verify the hop-by-hop path was followed.

In a further example, a collection of resources may be extended to allow a definition of a sequence of commands that achieves a goal. This collection of resources, further defined as a "service", or "controller" resource, may allow the performance of a collection of actions (a plurality of actions) to achieve some expected objective (such as "onboarding").

In the OCF resource model, resources and data from such resources are commonly utilized to represent actions with data. For example, to turn on a light bulb, a value representing "on" may be assigned to a "light bulb" resource. Within this resource model, an implication is that an appropriate action is conducted in response to the change of the data value. Accordingly, because everything in the OCF data model is representable as a resource and treated as a resource, a collection of resource and a set of commands that achieves a goal are also designed and used within this the resource model. The use of a service resource, within an array of actions, provides a data structure to manage of sequencing of actions while making sure that the entire state of the collection of actions is being executed in a proper order. Further, the use of a service resource allows a mechanism to roll back an action if an order of certain actions is not followed or is unsuccessful.

In an example, a service resource is defined from a collection of resources that facilitates a scripted interaction between a Device and a Controller (aka, a Service Provider). In an OCF implementation, some of the services that may be provided through this collection may include services for a DOTS, CMS, AMS, or Mediator. In an example, a service resource may be established as a Controller-side Collection of resources or a Device-side Collection of resources. For instance, the Controller-side Collection of resources may describe service data and actions, whereas the Device-side Collection of resources may describe device data and actions.

Also in an example, the service resource may be composed of a plurality of action resources, which are structured from respective action resource information (e.g., information to identify a type and name). The plurality of action resources may be defined from an array of actions, such as in the definition:

<Seq_#><CRUDN_Action><Role><Target_Device>
<Interface><R esource><Predicate><Next_Action>

The Sequence of Actions achieves an expected objective (e.g., "onboarding") for the service. The final <CRUDN_Action>"commits" the sequence of actions as complete. Failure to "commit" the sequence results in the pre-sequence resource replacing the affected resource.

The position of individual < > elements within an action definition may be arbitrary, as each element simply indicates one of the set of elements. Further, in an exchange between a device and server, each side of the conversation may share the resource. (In other words, peer_A may RETRIEVE the Action resource from peer_B at the start of the interaction so both peers have a copy). Additionally, <Next_Action> determines the expected next <Seq_#>, the <interface> defines the expected return results according to RESTful semantics, and <Role> determines authorizations needed to perform the Action. In further examples, each CRUDN_Action may require different authorization.

Additionally, the service resource may be tied to a service role through the use of identification information. For instance, such identification information may be provided from role identifiers naming the service type with controller-side or device-side qualifiers (e.g., "XyzService_Controller", "XyzService_Device").

The following table illustrates an example format of a service resource defined with an array of action resources.

TABLE 1

| |
|---|
| /MyAction : on Peer_A |
| <0> <"User"> <RETRIEVE> <UUID_Peer_A> <"read-only"> |
| </MyAction> <1> |
| <0> <"User"> <UPDATE> <UUID_Peer_B> <"write-only"> |
| </MyAction-###> <1> |
| <1> <"User"> <RETRIEVE> <UUID_Peer_B> <"read-only"> |
| </mylight> <"?on=false"> <2> |
| <2> <"Admin"> <UPDATE> <UUID_Peer_B> <"actuator"> |
| </mylight> <"on=true"> <3> |
| <3> <"Current_Session"> <UPDATE> <UUID_Peer_B> <"write"> |
| </MyAction-###> <"CommitAction=true"> <4> |
| <4> <"Current_Session"> <UPDATE> <UUID_Peer_A> <"write"> |
| </MyAction> <"CommitAction=true"> <FFFF> |
| <FFFF> -done- |

As provided in the example of Table 1, the array defines a sequence of commands to achieve a goal. The structure includes a sequence number, the command, and then some additional context. This context may indicate a role that is asserted to perform the action with proper authorization, the target device, what interface to use with the command, the resource that is affected, and predicate information that is the content of what is supposed to be updated.

As also provided in the example of Table 1, the array of action resource includes an action script ("/MyAction"), with a sequence of actions. For instance, the action script begins with Peer_B pulling Peer_A's /MyAction resource, followed by the action script having Peer_A pushing Peer_A's/MyAction resource. In the depicted example, Peer_B relies on an auto-numbering scheme that disambiguates the/MyAction instances as—###. The existence of two Step-"<0>" elements in the array means one or the other starts the Action script. As discussed above, the sequence of actions are committed if all actions are complete; if the actions are unable to be performed, then the pre-sequence resource may replace the affected resource.

Figure 10:
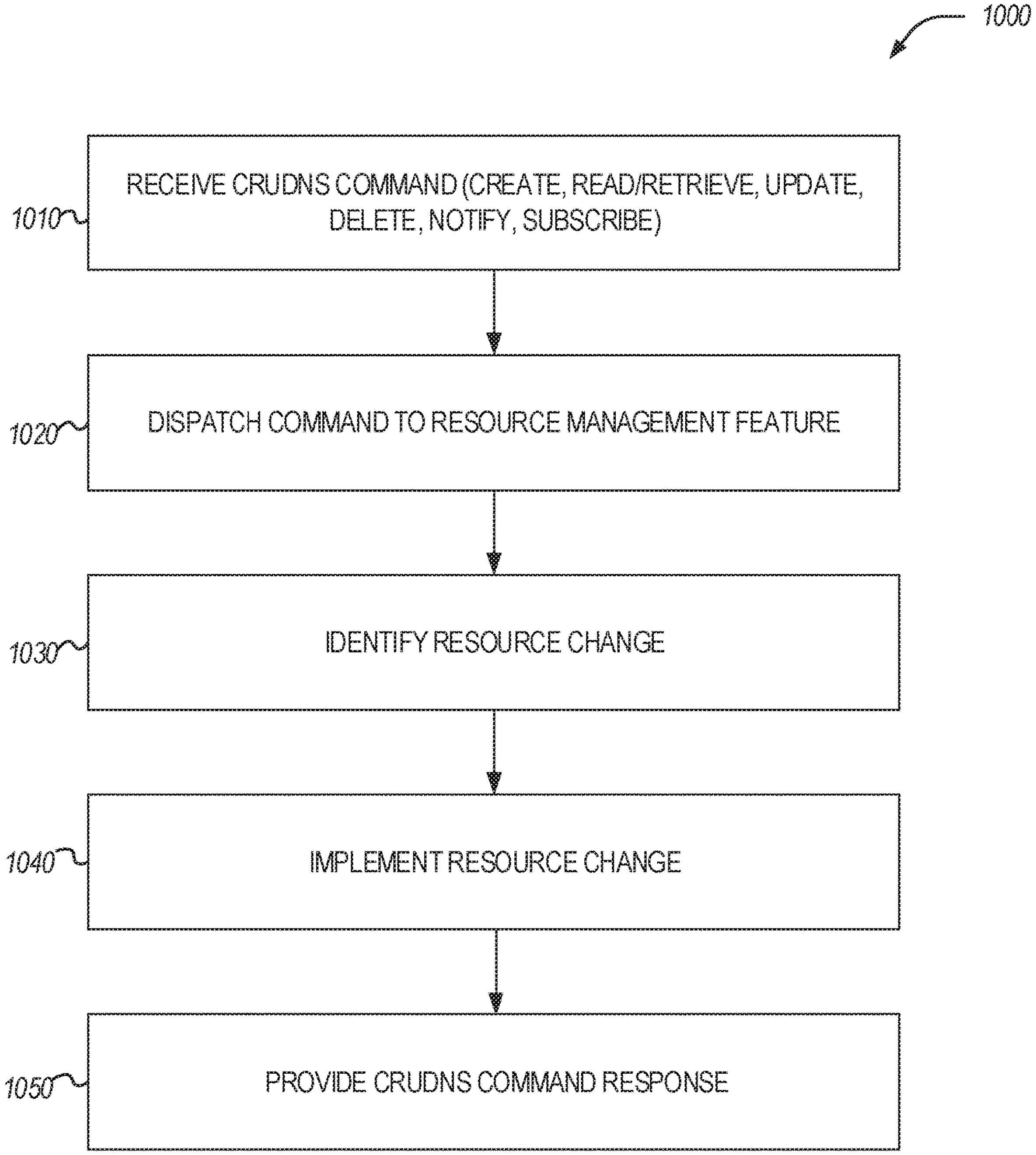
FIG. 10 illustrates a flowchart of a method for device resource management, usable with implementations of an array of resources, according to an example.

FIG. 10 illustrates a flowchart 1000 of an example method for device resource management, usable with implementations of an array of resources. In an example, the operations of the flowchart 1000 may be implemented by a single device, distributed operations among multiple devices or systems, or other functional implementations.

The flowchart 1000 commences at 1010 with the receiving of one or more RESTful CRUDNS commands (e.g., a create, read/retrieve, update, delete, notify, subscribe). This message may be a resource request command (e.g., resource request 706 received at the server 704) or a management command (e.g., one of the device management commands 806 received by a parent server). The subsequent operations of processing for the command may be specific to the type of command, as indicated in FIGS. 9A and 9B.

The flowchart 1000 continues at 1020 with operations to dispatch the command to a resource management feature, such as may be performed with parent or child resources (e.g., via CRUDNS processing 710 or device lifecycle processing 810). This resource management feature may operate at 1030 to identify an appropriate resource change to the array of resources, and then implement this resource change at 1040 to the array of resources. For instance, based on the type of command and the state of the resource, various operations may be performed to create, delete, update, or otherwise affect the state of the resource in the resource array. This resource change accordingly may utilize any of the type of operations depicted with respective commands in FIGS. 9A and 9B.

Finally, the flowchart 1000 concludes at 1050 with an operation to provide the command response to the CRUDNS command, based on the resource change and affected resource state. For instance, the state of the resource change, or values of the resource itself, may be returned in response to the RESTful CRUDNS command. Further, it will be understood that additional operations may occur based on the state of the array of resources, other types of RESTful commands, or as part of error/condition handling.

In an example, the operations and functionality described above with reference to FIGS. 3 to 10 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a machine in the form of a computer, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 11:
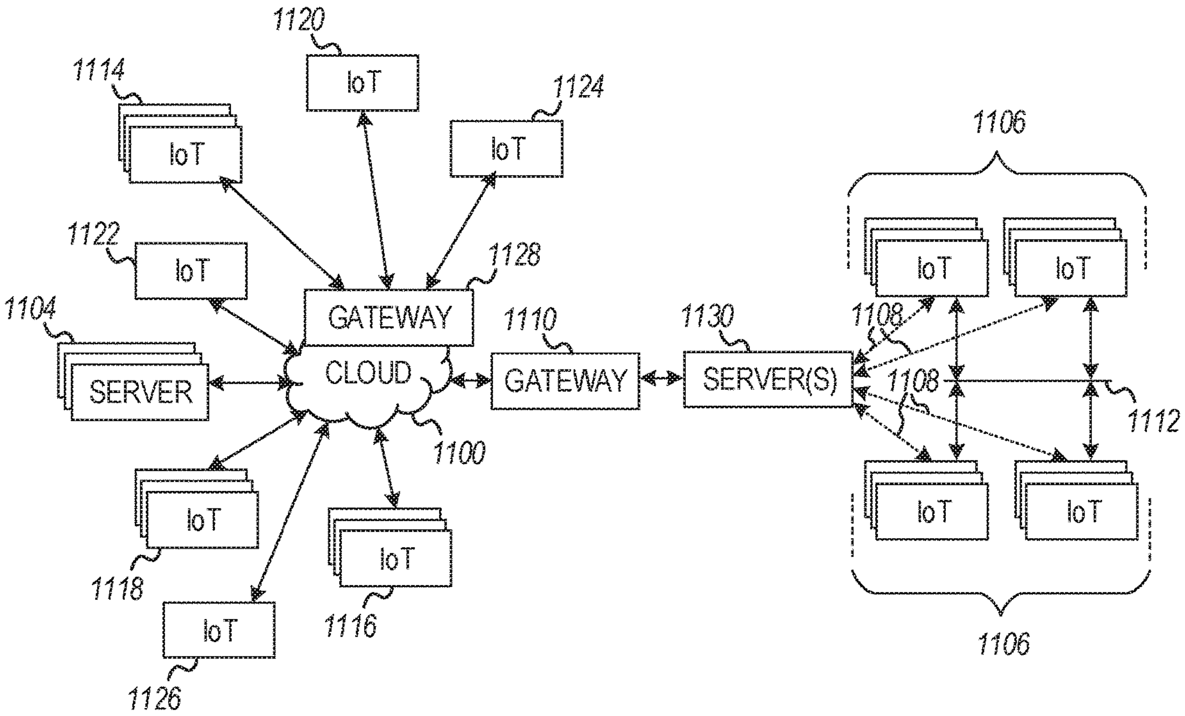
FIG. 11 illustrates a block diagram of a network illustrating communications among a number of IoT devices, according to an example.

FIG. 11 illustrates a drawing of a cloud computing network, or cloud 1100, in communication with a number of Internet of Things (IoT) devices. The cloud 1100 may represent the Internet, or may be a local area network (LAN), or a wide area network (WAN), such as a proprietary network for a company. The IoT devices may include any number of different types of devices, grouped in various combinations. For example, a traffic control group 1106 may include IoT devices along streets in a city. These IoT devices may include stoplights, traffic flow monitors, cameras, weather sensors, and the like. The traffic control group 1106, or other subgroups, may be in communication with the cloud 1100 through wired or wireless links 1108, such as LPWA links, optical links, and the like. Further, a wired or wireless sub-network 1112 may allow the IoT devices to communicate with each other, such as through a local area network, a wireless local area network, and the like. The IoT devices may use another device, such as a gateway 1110 or 1128 to communicate with remote locations such as the cloud 1100; the IoT devices may also use one or more servers 1130 to facilitate communication with the cloud 1100 or with the gateway 1110. For example, the one or more servers 1130 may operate as an intermediate network node to support a local edge cloud or fog implementation among a local area network. Further, the gateway 1128 that is depicted may operate in a cloud-to-gateway-to-many edge devices configuration, such as with the various IoT devices 1114, 1120, 1124 being constrained or dynamic to an assignment and use of resources in the cloud 1100.

Other example groups of IoT devices may include remote weather stations 1114, local information terminals 1116, alarm systems 1118, automated teller machines 1120, alarm panels 1122, or moving vehicles, such as emergency vehicles 1124 or other vehicles 1126, among many others. Each of these IoT devices may be in communication with other IoT devices, with servers 1104, with another IoT fog platform or system (not shown, but depicted in FIG. 2), or a combination therein. The groups of IoT devices may be deployed in various residential, commercial, and industrial settings (including in both private or public environments).

As may be seen from FIG. 11, a large number of IoT devices may be communicating through the cloud 1100. This may allow different IoT devices to request or provide information to other devices autonomously. For example, a group of IoT devices (e.g., the traffic control group 1106) may request a current weather forecast from a group of remote weather stations 1114, which may provide the forecast without human intervention. Further, an emergency vehicle 1124 may be alerted by an automated teller machine 1120 that a burglary is in progress. As the emergency vehicle 1124 proceeds towards the automated teller machine 1120, it may access the traffic control group 1106 to request clearance to the location, for example, by lights turning red to block cross traffic at an intersection in sufficient time for the emergency vehicle 1124 to have unimpeded access to the intersection.

Clusters of IoT devices, such as the remote weather stations 1114 or the traffic control group 1106, may be equipped to communicate with other IoT devices as well as with the cloud 1100. This may allow the IoT devices to form an ad-hoc network between the devices, allowing them to function as a single device, which may be termed a fog platform or system (e.g., as described above with reference to FIG. 2).

Figure 12:
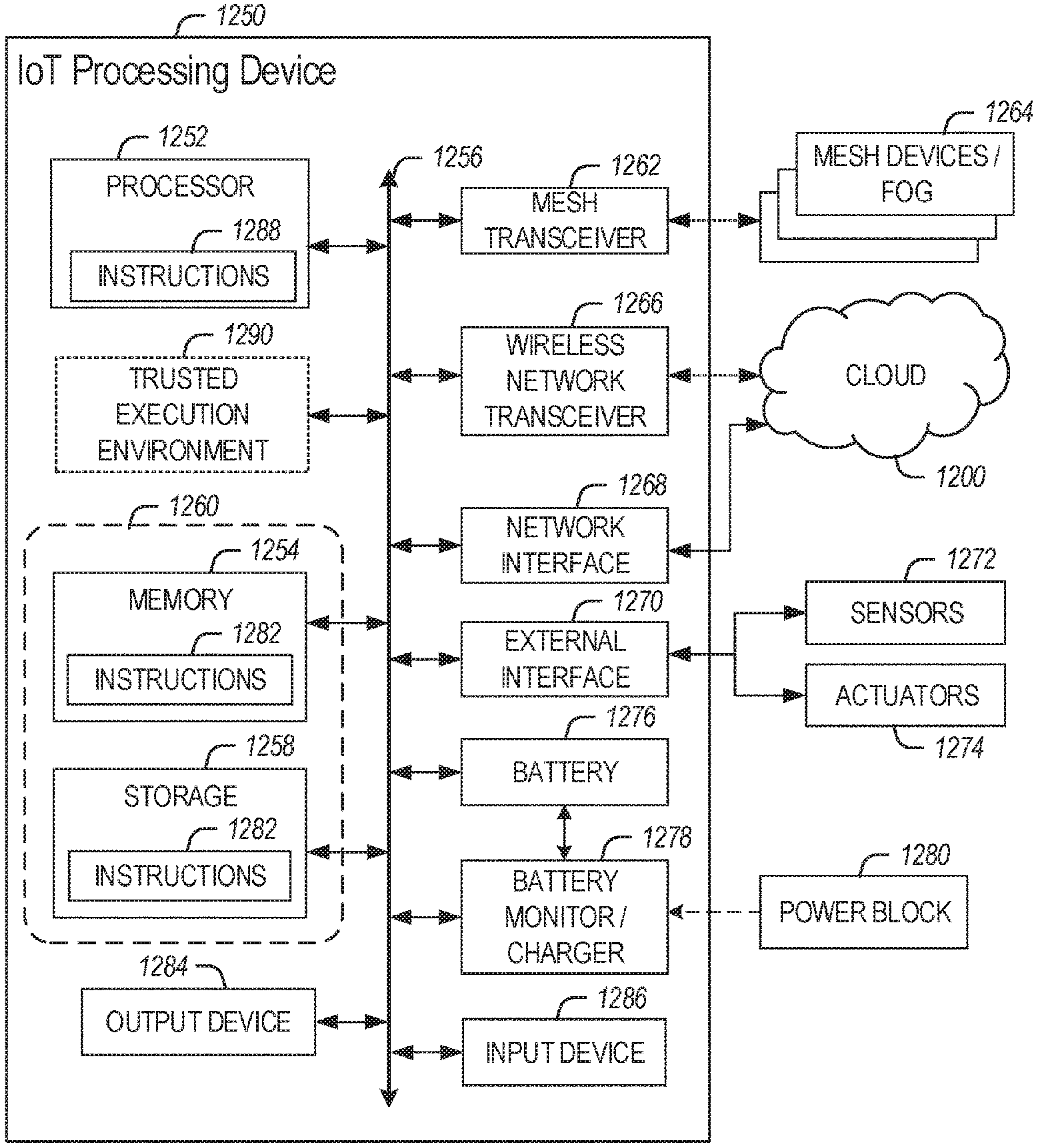
FIG. 12 illustrates a block diagram for an example IoT processing system architecture upon which any one or more of the techniques (e.g., operations, processes, methods, and methodologies) discussed herein may be performed.

FIG. 12 is a block diagram of an example of components that may be present in an IoT device 1250 for implementing the techniques described herein. The IoT device 1250 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1250, or as components otherwise incorporated within a chassis of a larger system. Additionally, the block diagram of FIG. 12 is intended to depict a high-level view of components of the IoT device 1250. However, some of the components shown may be omitted, additional components may be present, and different arrangement of the components shown may occur in other implementations.

The IoT device 1250 may include processing circuitry in the form of a processor 1252, which may be a microprocessor, a multi-core processor, a multithreaded processor, an ultra-low voltage processor, an embedded processor, or other known processing elements. The processor 1252 may be a part of a system on a chip (SoC) in which the processor 1252 and other components are formed into a single integrated circuit, or a single package, such as the Edison™ or Galileo™ SoC boards from Intel. As an example, the processor 1252 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif. an ARM-based design licensed from ARM Holdings. Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 1252 may communicate with a system memory 1254 over an interconnect 1256 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the interconnect 1256. In an example the storage 1258 may be implemented via a solid state disk drive (SSDD). Other devices that may be used for the storage 1258 include flash memory cards, such as SD cards, microSD cards, xD picture cards, and the like, and USB flash drives. In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in a SoC based system. Other bus systems may be included, such as an I2C interface, an SPI interface, point to point interfaces, and a power bus, among others.

The interconnect 1256 may couple the processor 1252 to a mesh transceiver 1262, for communications with other mesh devices 1264. The mesh transceiver 1262 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1264. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1262 may communicate using multiple standards or radios for communications at different range. For example, the IoT device 1250 may communicate with close devices, e.g., within about 10 meters, using a local transceiver based on BLE, or another low power radio, to save power. More distant mesh devices 1264, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1266 may be included to communicate with devices or services in the cloud 1200 via local or wide area network protocols. The wireless network transceiver 1266 may be a LPWA transceiver that follows the IEEE 802.15.4, or IEEE 802.15.4g standards, among others. The IoT device 1250 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox. and other technologies. Further, other communications techniques, such as time-slotted channel hopping, described in the IEEE 802.15.4e specification may be used.

Any number of other radio communications and protocols may be used in addition to the systems mentioned for the mesh transceiver 1262 and wireless network transceiver 1266, as described herein. For example, the radio transceivers 1262 and 1266 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1262 and 1266 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1266, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1268 may be included to provide a wired communication to the cloud 1200 or to other devices, such as the mesh devices 1264. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1268 may be included to allow connect to a second network, for example, a NIC 1268 providing communications to the cloud over Ethernet, and a second NIC 1268 providing communications to other devices over another type of network.

Given the variety of types of applicable communications from the device to another component or network, applicable communications circuitry used by the device may include or be embodied by any one or more of components 1262, 1266, 1268, or 1270. Accordingly, in various examples, applicable means for communicating (e.g., receiving, transmitting, etc.) may be embodied by such communications circuitry.

The interconnect 1256 may couple the processor 1252 to an external interface 1270 that is used to connect external devices or subsystems. The external devices may include sensors 1272, such as accelerometers, level sensors, flow sensors, optical light sensors, camera sensors, temperature sensors, a global positioning system (GPS) sensors, pressure sensors, barometric pressure sensors, and the like. The external interface 1270 further may be used to connect the IoT device 1250 to actuators 1274, such as power switches, valve actuators, an audible sound generator, a visual warning device, and the like.

In some optional examples, various input/output (I/O) devices may be present within, or connected to, the IoT device 1250. For example, a display or other output device 1284 may be included to show information, such as sensor readings or actuator position. An input device 1286, such as a touch screen or keypad may be included to accept input. An output device 1284 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1250.

A battery 1276 may power the IoT device 1250, although in examples in which the IoT device 1250 is mounted in a fixed location, it may have a power supply coupled to an electrical grid. The battery 1276 may be a lithium ion battery, or a metal-air battery, such as a zinc-air battery, an aluminum-air battery, a lithium-air battery, and the like.

A battery monitor/charger 1278 may be included in the IoT device 1250 to track the state of charge (SoCh) of the battery 1276. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas. Tex. The battery monitor/charger 1278 may communicate the information on the battery 1276 to the processor 1252 over the interconnect 1256. The battery monitor/charger 1278 may also include an analog-to-digital (ADC) convertor that allows the processor 1252 to directly monitor the voltage of the battery 1276 or the current flow from the battery 1276. The battery parameters may be used to determine actions that the IoT device 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the IoT device 1250. A wireless battery charging circuit, such as an LTC4020 chip from Linear Technologies of Milpitas, Calif., among others, may be included in the battery monitor/charger 1278. The specific charging circuits chosen depend on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine readable medium 1260 including code to direct the processor 1252 to perform electronic operations in the IoT device 1250. The processor 1252 may access the non-transitory, machine readable medium 1260 over the interconnect 1256. For instance, the non-transitory, machine readable medium 1260 may be embodied by devices described for the storage 1258 of FIG. 12 or may include specific storage units such as optical disks, flash drives, or any number of other hardware devices. The non-transitory, machine readable medium 1260 may include instructions to direct the processor 1252 to perform a specific sequence or flow of actions, for example, as described with respect to the flowchart(s) and block diagram(s) of operations and functionality depicted above.

In still a specific example, the instructions 1288 on the processor 1252 (separately, or in combination with the instructions 1288 of the machine readable medium 1260) may configure execution or operation of a trusted execution environment (TEE) 1290. In an example, the TEE 1290 operates as a protected area accessible to the processor 1252 for secure execution of instructions and secure access to data. Various implementations of the TEE 1290, and an accompanying secure area in the processor 1252 or the memory 1254 may be provided, for instance, through use of Intel® Software Guard Extensions (SGX) or ARM® TrustZone® hardware security extensions. Intel® Management Engine (ME), or Intel® Converged Security Manageability Engine (CSME). Other aspects of security hardening, hardware roots-of-trust, and trusted or protected operations may be implemented in the device 1250 through the TEE 1290 and the processor 1252.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: communications circuitry; processing circuitry; and a memory device including instructions embodied thereon, wherein the instructions, which when executed by the processing circuitry, configure the processing circuitry to perform operations comprising: instantiating, at the device and in response to receiving a RESTful message by the device, a first device management (DM) service instance; operating the first DM service instance; instantiating, at a second device and in response to the receiving of the RESTful message, a second DM service instance, based on a request provided from the device to the second device; and causing the operation of the second DM service instance, based on the request provided from the device to the second device.

In Example 2, the subject matter of Example 1 includes, the first DM service instance and the second DM service instance operating in a same DM service role, and wherein the second DM service instance is established as a peer service instance of the first DM service instance.

In Example 3, the subject matter of Examples 1-2 includes, the first DM service instance and the second DM service instance operating in different DM service roles, and wherein the second DM service instance is established as a subordinate service instance of the first DM service instance operating as a superior service instance.

In Example 4, the subject matter of Example 3 includes, the subordinate service instance being one of a plurality of subordinate services instances defined in a domain, and wherein the plurality of subordinate service instances and associated devices belong to the superior first DM service instance.

In Example 5, the subject matter of Examples 1-4 includes, the first DM service instance operating in a DM service role as a device owner transfer service (DOTS), and wherein the second DM service instance operates in a DM service role as a DOTS, an access management service (AMS), a credential management service (CMS), a domain controller (DC), or a zone controller (ZC).

In Example 6, the subject matter of Examples 1-5 includes: onboarding and provisioning the device onto a device network, as an initial step in response to the receiving of the RESTful message by the device, wherein the operations of instantiating the first DM service instance occur after the onboarding and provisioning.

In Example 7, the subject matter of Examples 1-6 includes: receiving the RESTful message at the device, wherein the RESTful message comprises a CREATE message: creating one or more resources on the device, in a first array of resources, based on the CREATE message; and creating one or more resources on the second device, in a second array of resources, based on the CREATE message.

In Example 8, the subject matter of Examples 1-7 includes: receiving a second RESTful message, wherein the second RESTful message comprises an UPDATE or DELETE message; and modifying the operation of the second DM service instance based on the second RESTful message.

In Example 9, the subject matter of Examples 1-8 includes: instantiating, at a third device and in response to the receiving of the RESTful message, a third DM service instance, based on a second request provided from the device to the third device; and causing the operation of the third DM service instance.

In Example 10, the subject matter of Example 9 includes, the second DM service instance being established as a peer service instance of the first DM service instance, and wherein the third DM service instance is established as a subordinate service instance of the first DM service instance, the first DM service instance being established as superior to the subordinate service instance.

In Example 11, the subject matter of Examples 1-10 includes, the second device being a member of a trusted device collection.

In Example 12, the subject matter of Example 11 includes, the trusted device collection including an array of resource model properties, wherein the array of resource model properties is used to define properties of operation for the first DM service instance.

In Example 13, the subject matter of Examples 1-12 includes, functions of the first DM service instance and the second DM service instance being represented in respective sets of resource data sets available to the device and the second device.

In Example 14, the subject matter of Examples 1-13 includes, the device operating the first device management (DM) service instance as a service of an onboarding tool and wherein the onboarding tool operates according to an Open Connectivity Foundation (OCF) specification.

Example 15 is a method for establishing a device management (DM) service configuration in a device network, using operations performed by a device comprising: instantiating, at the device and in response to receiving a RESTful message by the device, a first device management (DM) service instance; operating the first DM service instance; instantiating, at a second device and in response to the receiving of the RESTful message, a second DM service instance, based on a request provided from the device to the second device; and causing the operation of the second DM service instance, based on the request provided from the device to the second device.

In Example 16, the subject matter of Example 15 includes, the first DM service instance and the second DM service instance operating in a same DM service role, and wherein the second DM service instance is established as a peer service instance of the first DM service instance.

In Example 17, the subject matter of Examples 15-16 includes, the first DM service instance and the second DM service instance operating in different DM service roles, and wherein the second DM service instance is established as a subordinate service instance of the first DM service instance operating as a superior service instance.

In Example 18, the subject matter of Example 17 includes, the subordinate service instance being one of a plurality of subordinate services instances defined in a domain, and wherein the plurality of subordinate services and associated devices belong to the superior first DM service instance.

In Example 19, the subject matter of Examples 15-18 includes, the first DM service instance operating in a DM service role as a device owner transfer service (DOTS), and wherein the second DM service instance operates in a DM service role as a DOTS, an access management service (AMS), a credential management service (CMS), a domain controller (DC), or a zone controller (ZC).

In Example 20, the subject matter of Examples 15-19 includes: onboarding and provisioning the device onto a device network, as an initial step in response to the receiving of the RESTful message by the device, wherein the operations of instantiating the first DM service instance occur after the onboarding and provisioning.

In Example 21, the subject matter of Examples 15-20 includes: receiving the RESTful message at the device, wherein the RESTful message comprises a CREATE message; creating one or more resources on the device, in a first array of resources, based on the CREATE message; and creating one or more resources on the second device, in a second array of resources, based on the CREATE message.

In Example 22, the subject matter of Examples 15-21 includes: receiving a second RESTful message, wherein the second RESTful message comprises an UPDATE or DELETE message; and modifying the operation of the second DM service instance based on the second RESTful message.

In Example 23, the subject matter of Examples 15-22 includes: instantiating, at a third device and in response to the receiving of the RESTful message, a third DM service instance, based on a second request provided from the device to the third device; and causing the operation of the third DM service instance.

In Example 24, the subject matter of Example 23 includes, the second DM service instance being established as a peer service instance of the first DM service instance, and wherein the third DM service instance is established as a subordinate service instance of the first DM service instance, the first DM service instance being established as superior to the subordinate service instance.

In Example 25, the subject matter of Examples 15-24 includes, the second device being a member of a trusted device collection.

In Example 26, the subject matter of Example 25 includes, the trusted device collection including an array of resource model properties, wherein the array of resource model properties is used to define properties of operation for the first DM service instance.

In Example 27, the subject matter of Examples 15-26 includes, functions of the first DM service instance and the second DM service instance being represented in respective sets of resource data sets available to the device and the second device.

In Example 28, the subject matter of Examples 15-27 includes, the device operating the first device management (DM) service instance as a service of an onboarding tool, and wherein the onboarding tool operates according to an Open Connectivity Foundation (OCF) specification.

Example 29 is a machine-readable storage medium including instructions, wherein the instructions, when executed by a processing circuitry of a device, cause the processing circuitry to perform operations of any of Examples 15 to 28.

Example 30 is a system, comprising: a first device, comprising communications circuitry and processing circuitry, the communications circuitry operable to receive and transmit messages that manage a superior device management (DM) service, and the processing circuitry configured to perform operations that: instantiate, at the first device and in response to receiving a RESTful message with the communications circuitry, a first device management (DM) service instance; and operate the first DM service instance; a second device, comprising communications circuitry and processing circuitry, the communications circuitry operable to receive and transmit messages that manage a subordinate DM service, and the processing circuitry configured to perform operations that: instantiate, at the second device and in response to the receiving of the RESTful message at the first device, a second DM service instance that is a subordinate service to the first DM service instance, based on a request provided from the first device to the second device; and operate the second DM service instance, based on the request provided from the first device to the second device.

In Example 31, the subject matter of Example 30 includes, a third device, comprising communications circuitry and processing circuitry, the communications circuitry operable to receive and transmit messages that manage a subordinate DM service, and the processing circuitry configured to perform operations that: instantiate, at the second device and in response to the receiving of the RESTful message, a third DM service instance that is a peer service to the first DM service instance, based on a request provided from the first device to the third device; and operate the third DM service instance, based on the request provided from the first device to the second device.

Example 32 is an apparatus, comprising: means for instantiating, in response to receiving a RESTful message, a first device management (DM) service instance; means for operating the first DM service instance; means for instantiating, at a second device and in response to the receiving of the RESTful message, a second DM service instance, based on a request to the second device; and means for causing the operation of the second DM service instance, based on the request to the second device.

In Example 33, the subject matter of Example 32 includes, the first DM service instance and the second DM service instance operating in a same DM service role, and wherein the second DM service instance is established as a peer service instance of the first DM service instance.

In Example 34, the subject matter of Examples 32-32 includes, the first DM service instance and the second DM service instance operating in different DM service roles, and wherein the second DM service instance is established as a subordinate service instance of the first DM service instance operating as a superior service instance.

In Example 35, the subject matter of Example 34 includes, the subordinate service instance being one of a plurality of subordinate services instances defined in a domain, and wherein the plurality of subordinate services and associated devices belong to the superior first DM service instance.

In Example 36, the subject matter of Examples 32-35 includes, the first DM service instance operating in a DM service role as a device owner transfer service (DOTS), wherein the second DM service instance operates in a DM service role as a DOTS, an access management service (AMS), a credential management service (CMS), a domain controller (DC), or a zone controller (ZC).

In Example 37, the subject matter of Examples 32-36 includes, means for onboarding and provisioning onto a device network, as an initial step in response to the receiving of the RESTful message, wherein the operations of instantiating the first DM service instance occur after the onboarding and provisioning.

In Example 38, the subject matter of Examples 32-37 includes: means for receiving the RESTful message, wherein the RESTful message comprises a CREATE message; means for creating resources, in a first array of resources, based on the CREATE message; and means for creating resources on the second device, in a second array of resources, based on the CREATE message.

In Example 39, the subject matter of Examples 32-38 includes: means for receiving a second RESTful message, wherein the second RESTful message comprises an UPDATE or DELETE message; and means for modifying the operation of the second DM service instance based on the second RESTful message.

In Example 40, the subject matter of Examples 32-39 includes, means for instantiating, at a third device and in response to the receiving of the RESTful message, a third DM service instance, based on a second request to the third device; and means for causing the operation of the third DM service instance.

In Example 41, the subject matter of Example 40 includes, the second DM service instance being established as a peer service instance of the first DM service instance, and wherein the third DM service instance is established as a subordinate service instance of the first DM service instance, the first DM service instance being established as superior to the subordinate service instance.

In Example 42, the subject matter of Examples 32-41 includes, means for managing the second device as member of a trusted device collection.

In Example 43, the subject matter of Example 42 includes, means for updating the trusted device collection, wherein the trusted device collection includes an array of resource model properties, and wherein the array of resource model properties is used to define properties of operation for the first DM service instance.

In Example 44, the subject matter of Examples 32-43 includes, means for representing and managing functions of the first DM service instance and the second DM service instance in respective sets of resource data sets available for devices.

Example 45 is an IoT services platform adapted to perform the operations of any of Examples 1 to 44.

Example 46 is a fog platform adapted to perform the operations of any of Examples 1 to 44.

Example 47 is an Open Connectivity Foundation (OCF) device, configured as a server, client, or intermediary according to an OCF specification, comprising means to implement the operations of any of Examples 1 to 44.

Example 48 is a device owner transfer service management service adapted to perform the operations invoked by any of Examples 1 to 44.

Example 49 is an access management service adapted to perform the operations invoked by any of Examples 1 to 44.

Example 50 is a credential management service adapted to perform the operations invoked by any of Examples 1 to 44.

Example 51 is an Internet of Things (IoT) network topology, the IoT network topology comprising respective communication links adapted to perform communications for the operations of any of Examples 1 to 44.

Example 52 is a network comprising respective devices and device communication mediums for performing any of the operations of Examples 1 to 44.

Example 53 is an edge cloud computing device implementation comprising processing nodes and computing units adapted for performing any of the operations of Examples 1 to 44.

Example 54 is an edge cloud network platform comprising physical and logical computing resources adapted for performing any of the operations of Examples 1 to 44.

Example 55 is an apparatus comprising means for performing any of the operations of Examples 1 to 44.

Example 56 is a system to perform the operations of any of Examples 1 to 44.

The operations and functionality described above in these examples, and in the specific embodiments described with reference to FIGS. 3 to 10, may apply in a variety of network settings such as IoT networking, edge networking, fog networking, cloud networking, and all hybrids thereof. The operations and functionality of these examples and configurations may occur in a distributed fashion, including in distributed networked settings where one aspect of the functionality is performed by a first IoT edge device or edge network, another aspect of the functionality is performed by a fog network or platform, and yet another aspect of the functionality is performed by a cloud device or system. Further combinations which follow these shared, distributed, or grouping principles, as suggested in the examples and configurations above, can be employed. Accordingly, it will be evident that the functionality described herein may be operable to work within many permutations of the examples and configurations above, and like variations.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device, comprising:

communications circuitry to communicate with a network of devices;

processing circuitry; and a memory device including instructions embodied thereon, wherein the instructions, which when executed by the processing circuitry, configure the processing circuitry to perform operations comprising:

instantiating, at the device and in response to receiving a RESTful message by the device, a first device management (DM) service instance, wherein the first DM service instance is used to dynamically provide a requested onboarding, access management, and credential management service, on demand, to other devices in the network of devices;

operating the first DM service instance;

verifying that a second device has been onboarded to the network of devices;

causing, at the second device and in response to the receiving of the RESTful message, instantiation of a second DM service instance, based on a request provided from the device to the second device, wherein the second DM service instance is used to dynamically provide another requested onboarding, access management, and credential management service, on demand, to the other devices in the network of devices, wherein the onboarding of the second device is a prerequisite to instantiating the second DM service instance; and causing the operation of the second DM service instance at the second device, based on the request provided from the device to the second device.

2. The device of claim 1, wherein the second DM service instance is established as a peer service instance of the first DM service instance.

3. The device of claim 1, wherein the second DM service instance is established as a subordinate service instance of the first DM service instance operating as a superior service instance.

4. The device of claim 3, wherein the subordinate service instance is one of a plurality of subordinate services instances defined in a domain, and wherein the plurality of subordinate service instances and associated devices belong to the superior first DM service instance.

5. The device of claim 1, wherein the service instances operate according to an Open Connectivity Foundation (OCF) specification.

6. The device of claim 1, the operations further comprising:

onboarding and provisioning the device onto the network of devices, as an initial step in response to the receiving of the RESTful message by the device, wherein the operations of instantiating the first DM service instance occur after the onboarding and provisioning.

7. The device of claim 1, the operations further comprising:

receiving the RESTful message at the device, wherein the RESTful message comprises a CREATE message;

creating one or more resources on the device, in a first array of resources, based on the CREATE message; and creating one or more resources on the second device, in a second array of resources, based on the CREATE message.

8. The device of claim 1, the operations further comprising:

receiving a second RESTful message, wherein the second RESTful message comprises an UPDATE or DELETE message; and modifying the operation of the second DM service instance based on the second RESTful message.

9. The device of claim 1, the operations further comprising:

verifying that a third device has been onboarded to the network of devices;

instantiating, at the third device and in response to the receiving of the RESTful message, a third DM service instance, based on a second request provided from the device to the third device, wherein the third DM service instance is used to dynamically provide another subsequent requested onboarding, access management, and credential management service, on demand to the other devices in the network of devices, and wherein the onboarding of the third device is a prerequisite to instantiating the third DM service instance; and causing the operation of the third DM service instance.

10. The device of claim 9, wherein the second DM service instance is established as a peer service instance of the first DM service instance, and wherein the third DM service instance is established as a subordinate service instance of the first DM service instance, the first DM service instance being established as superior to the subordinate service instance.

11. The device of claim 1, wherein the second device is a member of a trusted device collection, wherein the trusted device collection includes an array of resource model properties, wherein the array of resource model properties is used to define properties of operation for the first DM service instance.

12. The device of claim 1, wherein the device operates the first device management (DM) service instance as a service of an onboarding tool, and wherein the onboarding tool operates according to an Open Connectivity Foundation (OCF) specification.

13. A method for establishing a device management (DM) service configuration in a device network, using operations performed by a device comprising:

instantiating, at the device and in response to receiving a RESTful message by the device, a first device management (DM) service instance, wherein the first DM service instance is used to dynamically provide a requested onboarding, access management, and credential management service, on demand, to other devices in the device network;

operating the first DM service instance;

verifying that a second device has been onboarded to the device network;

causing, at the second device and in response to the receiving of the RESTful message, instantiation of a second DM service instance, based on a request provided from the device to the second device, wherein the second DM service instance is used to dynamically provide another requested onboarding, access management, and credential management service, on demand, to the other devices in the device network, wherein the onboarding of the second device is a prerequisite to instantiating the second DM service instance; and causing the operation of the second DM service instance at the second device, based on the request provided from the device to the second device.

14. The method of claim 13, wherein the second DM service instance is established as a peer service instance of the first DM service instance.

15. The method of claim 13, wherein the second DM service instance is established as a subordinate service instance of the first DM service instance operating as a superior service instance.

16. The method of claim 15, wherein the subordinate service instance is one of a plurality of subordinate services instances defined in a domain, and wherein the plurality of subordinate services and associated devices belong to the superior first DM service instance.

17. The method of claim 13, wherein the service instances operate according to an Open Connectivity Foundation (OCF) specification.

18. The method of claim 13, the operations further comprising:

onboarding and provisioning the device onto the device network, as an initial step in response to the receiving of the RESTful message by the device, wherein the operations of instantiating the first DM service instance occur after the onboarding and provisioning.

19. The method of claim 13, the operations further comprising:

receiving the RESTful message at the device, wherein the RESTful message comprises a CREATE message;

creating one or more resources on the device, in a first array of resources, based on the CREATE message; and creating one or more resources on the second device, in a second array of resources, based on the CREATE message.

20. The method of claim 13, the operations further comprising:

receiving a second RESTful message, wherein the second RESTful message comprises an UPDATE or DELETE message; and modifying the operation of the second DM service instance based on the second RESTful message.

21. The method of claim 13, the operations further comprising:

verifying that a third device has been onboarded to the device network;

instantiating, at the third device and in response to the receiving of the RESTful message, a third DM service instance, based on a second request provided from the device to the third device, wherein the third DM service instance is used to dynamically provide another subsequent requested onboarding, access management, and credential management service, on demand to the other devices in the network of devices, and wherein the onboarding of the third device is a prerequisite to instantiating the third DM service instance; and causing the operation of the third DM service instance.

22. The method of claim 21, wherein the second DM service instance is established as a peer service instance of the first DM service instance, and wherein the third DM service instance is established as a subordinate service instance of the first DM service instance, the first DM service instance being established as superior to the subordinate service instance.

23. The method of claim 13, wherein functions of the first DM service instance and the second DM service instance are represented in respective sets of resource data sets available to the device and the second device.

24. A non-transitory machine-readable storage medium including instructions, wherein the instructions, when executed by a processing circuitry of a device, cause the processing circuitry to perform operations comprising:

instantiating, at the device and in response to receiving a RESTful message by the device, a first device management (DM) service instance, wherein the first DM service instance is used to dynamically provide a requested onboarding, access management, and credential management service, on demand, to other devices in a network of devices;

operating the first DM service instance;

verifying that a second device has been onboarded to the network of devices;

causing, at the second device and in response to the receiving of the RESTful message, instantiation of a second DM service instance, based on a request provided from the device to the second device, wherein the second DM service instance is used to dynamically provide another requested onboarding, access management, and credential management service, on demand, to the other devices in the network of devices, wherein the onboarding of the second device is a prerequisite to instantiating the second DM service instance; and causing the operation of the second DM service instance at the second device, based on the request provided from the device to the second device.

25. The machine-readable storage medium of claim 24, wherein the service instances operate according to an Open Connectivity Foundation (OCF) specification.

* * * * *

UNITED STATES PATENT AND TRADEMARK OFFICE

CERTIFICATE OF CORRECTION

PATENT NO. : 11,316,932 B2
APPLICATION NO. : 16/637650
DATED : April 26, 2022
INVENTOR(S) : Ned M. Smith It is certified that error appears in the above-identified patent and that said Letters Patent is hereby corrected as shown below:

On the Title Page

On page 2, in Column 2, under “Other Publications”, Line 3, delete “architectur”,” and insert --architecture”,-- therefor On page 2, in Column 2, under “Other Publications”, Lines 4-5, delete “Telecmmunications” and insert --Telecommunications-- therefor Signed and Sealed this
First Day of November, 2022

Katherine Kelly Vidal
*Director of the United States Patent and Trademark Office*